(12) United States Patent
Li et al.

(10) Patent No.: US 12,066,586 B2
(45) Date of Patent: Aug. 20, 2024

(54) LITHOFACIES GUIDED CORE DESCRIPTION USING UNSUPERVISED MACHINE LEARNING

(71) Applicant: Saudi Arabian Oil Company, Dhahran (SA)

(72) Inventors: Yunsheng Li, Dhahran (SA); Weihua Wang, Dhahran (SA); Maan A. Hawi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/722,964

(22) Filed: Apr. 18, 2022

(65) Prior Publication Data

US 2023/0333277 A1    Oct. 19, 2023

(51) Int. Cl.
| | |
|---|---|
| *G01V 11/00* | (2006.01) |
| *E21B 47/00* | (2012.01) |
| *E21B 49/00* | (2006.01) |
| *G06N 3/02* | (2006.01) |
| *G06N 3/088* | (2023.01) |
| *G06N 20/00* | (2019.01) |

(52) U.S. Cl.
CPC ............ *G01V 11/00* (2013.01); *E21B 49/005* (2013.01); *E21B 47/00* (2013.01); *E21B 49/00* (2013.01); *E21B 2200/20* (2020.05); *E21B 2200/22* (2020.05); *G06N 3/02* (2013.01); *G06N 3/088* (2013.01); *G06N 20/00* (2019.01)

(58) Field of Classification Search
CPC ... G01V 11/00; E21B 49/005; E21B 2200/20; E21B 2200/22; E21B 47/00; E21B 49/00; G06N 20/00; G06N 3/02; G06N 3/088
See application file for complete search history.

(56) References Cited

U.S. PATENT DOCUMENTS

| | | | |
|---|---|---|---|
| 2013/0297272 A1* | 11/2013 | Sung ...................... | G01V 11/00 703/10 |
| 2014/0149041 A1* | 5/2014 | Sung .................... | G01V 99/005 702/11 |

(Continued)

FOREIGN PATENT DOCUMENTS

WO    WO-2021130512 A1 *   7/2021

OTHER PUBLICATIONS

Dubois et al. (Comparison of four approaches to a rock facies classification problem, Computers & Geosciences, vol. 33, Issue 5, 2007, pp. 599-617, ISSN 0098-3004, https://doi.org/10.1016/j.cageo.2006.08.011) (Year: 2007).*

(Continued)

*Primary Examiner* — Manish S Shah
*Assistant Examiner* — Christian T Bryant
(74) *Attorney, Agent, or Firm* — Fish & Richardson P.C.

(57) ABSTRACT

A computer-implemented method that enables lithofacies guided core description using unsupervised machine learning is described herein. The method includes obtaining well log curves for a wells in a zone. The method also includes predicting lithofacies for the wells using a machine learning model. The machine learning model is trained with input data comprising additional well log curves and well cores. The method includes grouping the wells based on the predicted lithofacies, and updating core descriptions of the wells based on the grouped wells.

17 Claims, 23 Drawing Sheets
(18 of 23 Drawing Sheet(s) Filed in Color)

(56) References Cited

U.S. PATENT DOCUMENTS

| | | | | |
|---|---|---|---|---|
| 2015/0347898 | A1* | 12/2015 | Hiu | G01V 99/005 |
| | | | | 706/21 |
| 2017/0286802 | A1* | 10/2017 | Mezghani | G06F 18/2413 |
| 2019/0368316 | A1* | 12/2019 | Bize-Forest | G06F 16/355 |
| 2021/0110280 | A1* | 4/2021 | Akkurt | G01V 5/12 |
| 2021/0318465 | A1* | 10/2021 | Prindle | G01V 1/306 |

OTHER PUBLICATIONS

Li (Machine Learning for the Subsurface Characterization at Core, Well, and Reservoir Scales, University of Oklahoma, 2020) (Year: 2020).*

Hall (Facies classification using machine learning, The Leading Edge, Oct. 2016, vol. 35, Issue 10, 906-909, https://doi.org/10.1190/tle35100906.1) (Year: 2016).*

Ma (Quantitative Geosciences: Data Analytics, Geostatistics, Reservoir Characterization and Modeling, Chapter 10, Jul. 2019, ISBN : 978-3-030-17859-8) (Year: 2019).*

Eriavbe et al. ("Machine Learning Application to Permeability Prediction Using Log & Core Measurements: A Realistic Workflow Application for Reservoir Characterization." SPE Nigeria Annual International Conference and Exhibition, Lagos, Nigeria, Aug. 2019. doi: https://doi.org/10.2118/198874-MS (Year: 2019).*

Bestagini et al., "A Machine Learning Approach to Facies Classification Using Well Logs," SEG Technical Program Abstracts, Sep. 2017, 5 pages.

Chudinova et al., "The Neural Network for Grouping Wells of Different Facies Zones of Productive Layer," IOP Conf. Series: Earth and Environmental Science, Nov. 2018, 194:082008, 7 pages.

Dixit et al., "Machine Learning-Based Probabilistic Lithofacies Prediction from Conventional Well Logs: A Case from the Umiat Oil Field of Alaska," Energies, Sep. 2020, 13(18):4862, 15 pages.

La Croix et al., "Facies Prediction From Well Logs in the Precipice Sandstone and Evergreen Formation in the Surat Basin," The University of Queensland, Australia, Technical Report, Apr. 2019, 47 pages.

Martin et al., "Centimeter-Scale Lithology and Facies Prediction in Cored Wells Using Machine Learning," Frontiers in Earth Science, Jun. 2021, 9:491, 18 pages.

Patrick et al., "Identification of Lithofacies and Depositional Environment: Case study of Teger Oil Field Niger Delta," Petroleum Technology Development Journal, Jan. 2017, 7(1):78-90, 14 pages.

\* cited by examiner

LITHOFACIES GUIDED CORE
DESCRIPTION USING UNSUPERVISED
MACHINE LEARNING

TECHNICAL FIELD

This disclosure relates generally to reservoir characterization.

BACKGROUND

A retrieved well core is a sample of a reservoir formation extracted from beneath the surface of the earth, and can provide direct/accurate measurements of reservoir characteristics and physical evidence related to the reservoir formation. In some cases, evidence of reservoir characteristics can also be found above the surface of the earth, such as that evidenced by a rock outcrop.

SUMMARY

An embodiment described herein provides a method for lithofacies guided core description using unsupervised machine learning. The method includes obtaining well log curves for a wells in a zone and predicting lithofacies for the wells using a machine learning model. The machine learning model is trained with input data that includes additional well log curves and well cores. The method includes grouping the wells based on the predicted lithofacies and updating core descriptions of the wells based on the grouped wells.

An embodiment described herein provides an apparatus comprising a non-transitory, computer readable, storage medium that stores instructions that, when executed by at least one processor, cause the at least one processor to perform operations. The operations include obtaining well log curves for a wells in a zone and predicting lithofacies for the wells using a machine learning model. The machine learning model is trained with input data that includes additional well log curves and well cores. The operations include grouping the wells based on the predicted lithofacies and updating core descriptions of the wells based on the grouped wells.

An embodiment described herein provides a system. The system comprises one or more memory modules and one or more hardware processors communicably coupled to the one or more memory modules. The one or more hardware processors is configured to execute instructions stored on the one or more memory models to perform operations. The operations include obtaining well log curves for a wells in a zone and predicting lithofacies for the wells using a machine learning model. The machine learning model is trained with input data that includes additional well log curves and well cores. The operations include grouping the wells based on the predicted lithofacies and updating core descriptions of the wells based on the grouped wells.

BRIEF DESCRIPTION OF DRAWINGS

The patent or application file contains at least one drawing executed in color. Copies of this patent or patent application publication with color drawings will be provided by the Office upon request and payment of the necessary fee.

DETAILED DESCRIPTION

Figure 1A:
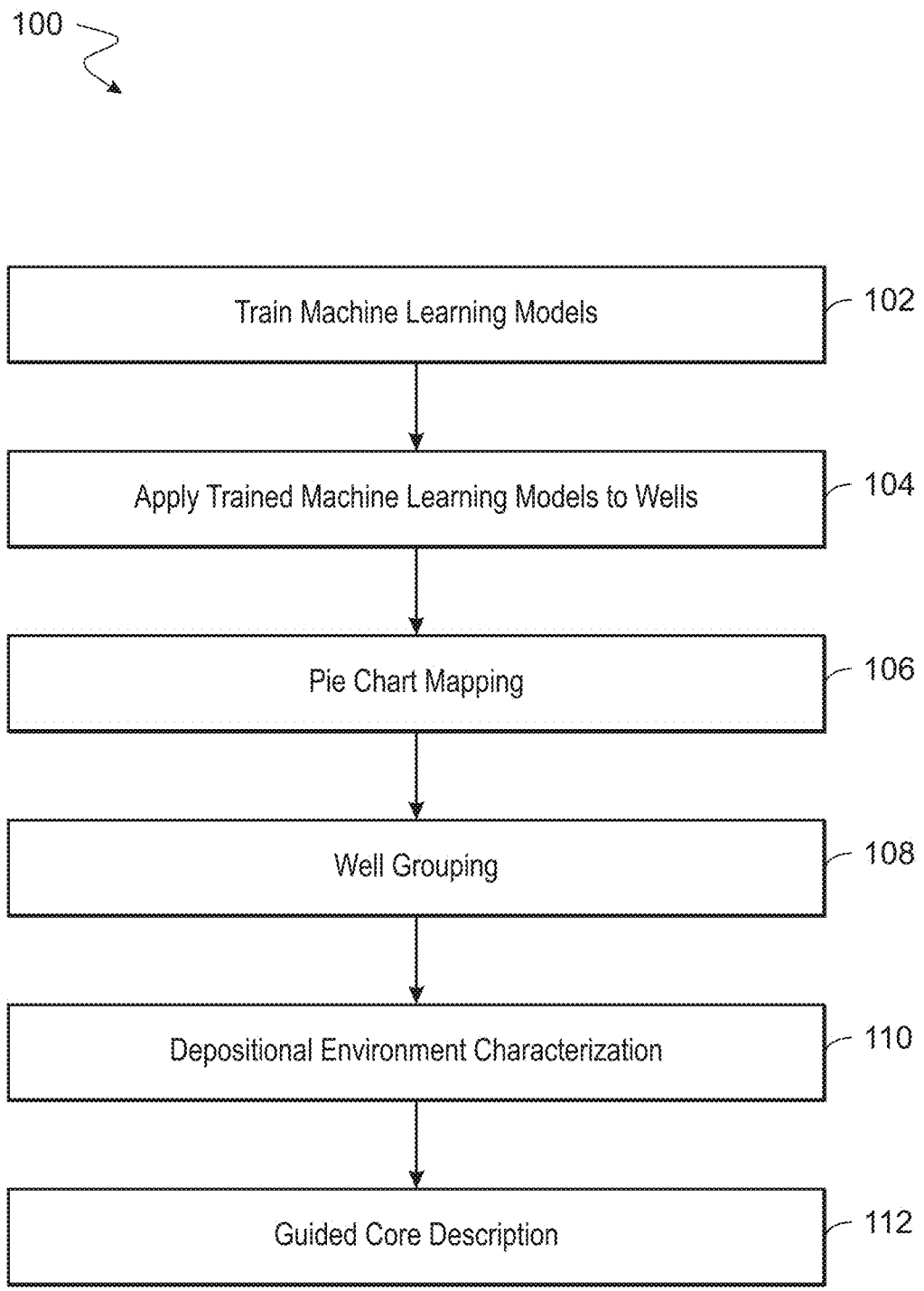
FIG. 1A is an illustration of a workflow for lithofacies guided core description using unsupervised machine learning.

A well core is a piece of rock that includes one or more lithofacies extracted from a wellbore beneath the earth's surface. The well core provides data that includes actual/accurate physical evidence of reservoir characteristics. In some instances, well cores can also reveal structural dip, fault, fracture, porosity, mineral composition, and/or other values, conditions, etc. Traditionally, sedimentologists or other experts visually examine a well core sampled from the reservoir and describe the well core's physical characteristics. Physical characteristics include color, texture, grain size, and composition. In some cases, reservoir formations can be found above the earth's surface, such as in a rock outcrop. The characteristics of rock outcrops and other surface features can be interpreted to estimate reservoir characteristics, such as the contact and boundary of a reservoir. Additional reservoir characteristics include, for example, rock type, formation thickness, porosity, permeability, oil/gas/water saturation, etc.

Well core data provides the ground truth, physical evidence of the subsurface structure. Well core data is accurate and provides a definite knowledge of actual rock facies of the reservoir. Well core data carries a substantial cost to acquire. In examples, to obtain well cores the tools used to drill the well are removed and replaced with the core acquiring instrument. The multiple tool changes that occur when obtaining well cores consumes time and prolongs drilling of the well. This in turn adds to the cost of the well. A small number of wells in a field development have core samples taken due the time consumed and the associated costs.

Embodiments described herein enable lithofacies guided core description using unsupervised machine learning. Wireline log curves for selected wells in a predetermined area (e.g., zone) are used as training data for a machine learning model. In examples, log curves measure the properties of the subsurface, such as porosity, density, lithologies, etc. The machine learning model is trained using unsupervised machine learning. The trained machine learning model takes as input wireline log curves for a well in the predetermined area. Predicted lithofacies for the wells in the predetermined area are output by the trained machine learning model. Predicted lithofacies are based on a combination of different log curves and predicted using machine learning to enable a more accurate characterization of the subsurface. The wells are grouped based on the distribution of the predicted lithofacies. Grouped lithofacies derived from direct measurement of formations are determined, and the grouped lithofacies guide core description. Depositional environment trends/associations are determined using the grouped wells.

The present techniques describe grouping of the wells drilled in an area based on common wireline log curves, such as Gamma Ray, Bulk Density and Neutron Porosity log curves. The logging program for a well is determined based on petrophysical properties of the well or reservoir formation, the engineering characteristics of the hole (mud type, hole diameter, etc.), and the problems to be resolved by the measurements. In some embodiments, the wireline log curves are a continuous measurement of reservoir formation properties with electrically powered instruments to infer properties and make decisions about drilling and production. In examples, curves computed from data points in the measured well logs and are referred to as wireline log curves. Lithofacies derived from the wireline log curves are used to guide the core description of wells. In examples, the core description of wells is performed in a core laboratory, and the present techniques save time and improve accuracy of the core description. In some embodiments, the present techniques are used to revise and update traditional core descriptions in a developed oil and gas field.

Cores are the ground truth for reservoir characterization, and core description is the most common way to utilize core data by sedimentologists. It can be challenging to describe well cores with high accuracy and efficiency due to the core quality and the limitation of human eyes. At the same time, conventional wireline log curves are the direct measurements of those cored formations which were deposited millions of years ago in different depositional environments. The present techniques combine the log curves with well core data to predict lithofacies that improve core descriptions for cored and un-cored wells.

FIG. 1A is an illustration of a workflow 100 that enables lithofacies guided core description using unsupervised machine learning. In some embodiments, the workflow 100 is executed via the process 2000 of FIG. 20 or the controller 2100 of FIG. 21. The present techniques train a machine learning model to predict lithofacies of a well using a combination of log curves and core samples. Lithofacies are the sedimentary features which were deposited millions of years ago by gravity, water, wind, ice or chemical reactions in a sedimentary environment. In some embodiments, lithofacies are a mappable subdivision of a stratigraphic unit that can be distinguished by its facies or lithology—the texture, mineralogy, grain size, and the depositional environment that produced it. The recognition of lithofacies can help sedimentologists to find the good reservoirs in a formation which were composed of different types of lithofacies. Traditionally, sedimentologists can use data such as outcrops, drilling cuttings, and core descriptions to classify the depositional environment in the study area. However, the use of outcrops, drilling cuttings, and core descriptions consumes a relatively large amount of time and effort. Additionally, the traditional identification of the depositional environment using outcrops, drilling cutting, and core descriptions by sedimentologists or other experts is often inaccurate due to the limit of the data applied. For example, outcrop data is acquired outside in the fields, such as mountainous areas. Traditionally, sedimentologists spend days, weeks, or even months to finish the outcrops description and analysis. In examples, drilling cuttings are very tiny rocks extracted with the drilling mud. The drilling cuttings are mixed with the mud, and the accuracy of core descriptions based on the drilling cuttings is not high. Core descriptions are sparse due to the limited availability of well cores.

Log curves are very common and exist for most wells. Wireline log curves are the direct measurements of the underground formations, and therefore contain large amounts of information on the formation. In some embodiments, log curves such as Gamma Ray, Bulk Density and Neutron Porosity exist in almost all the wells drilled in an oil and/or gas field. The workflow 100 uses available wireline log curves to predict lithofacies that are used to group wells. The grouped wells are evaluated to classify the depositional environment during the core description process. In some embodiments, unsupervised machine learning techniques are used to build a machine learning model for selected wells and predict lithofacies for all the wells in the study area. The study area is a region of interest, such as an oil field. After the prediction, all the wells are divided into groups based on the predicted lithofacies. The association of lithofacies in each group reflects certain depositional environment associations. This is very helpful for the core description and will greatly improve the accuracy and efficiency of core description.

At block 102, the machine learning model is trained. In some embodiments, a machine learning model is trained for each zone. A zone refers to a vertical unit defined by two stratigraphic surfaces. In examples, zones are determined by sedimentologists or other experts based on the formation tops. Formation tops are based on a log curve signature along the wellbore. In examples, zones are determined using well logs through multiple well log correlations. Additionally, in examples, core samples are used to determine zones. Machine learning models are trained for each zone using unsupervised machine learning.

Figure 1B:
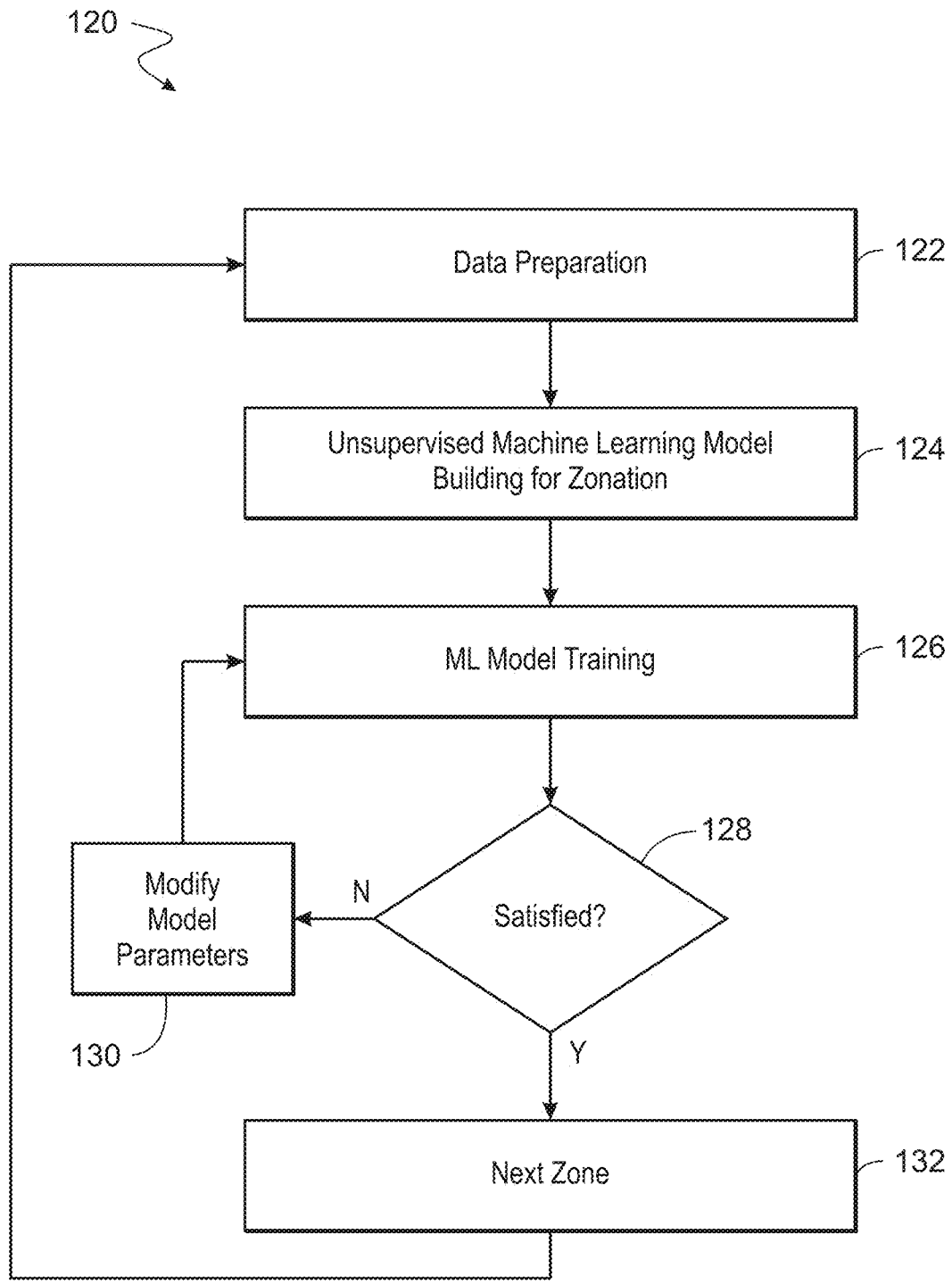
FIG. 1B shows a process flow diagram that describes a process of training machine learning models.

FIG. 1B shows a process flow diagram 120 that describes a process of training machine learning models. At block 122, the input data is prepared. In embodiments, input data includes one or more well log curves and zonation data, which is zone specific data. Data preparation is applied to log curves used to build the machine learning model and zone data which will be used to limit the prediction. In examples, zone data is prepared and used to limit the log normalization and lithofacies prediction to a current, target zone. The zone data limits the log data used for normalization and lithofacies prediction. In some embodiments, a zone has similar petrophysical property and lithofacies associations for wells in the zone. Log normalization and lithofacies prediction are processed zone by zone to avoid being affected by different zones with similar log signatures but different lithofacies associations. In examples, a log signature is a combination of one or more log curves with different features. In the manner, effects from other zones are reduced and the prediction accuracy improved.

In data preparation 122, log curves are obtained for the wells specified in the study area. Log curves can be any log data which is most commonly captured in most of the wells, such as Gamma Ray (GR), Bulk Density (RHOB), Neutron Porosity (NPHI), Total Porosity (PHIT), Compressional Slowness (DT), as well as the volumes of the mineral calculated by a petrophysicist. The present techniques use three log curves to predict lithofacies, however any number of log curves can be used. An accuracy of the predicted lithofacies is lower if the machine learning model is trained with less than three log curves.

Figure 2A:
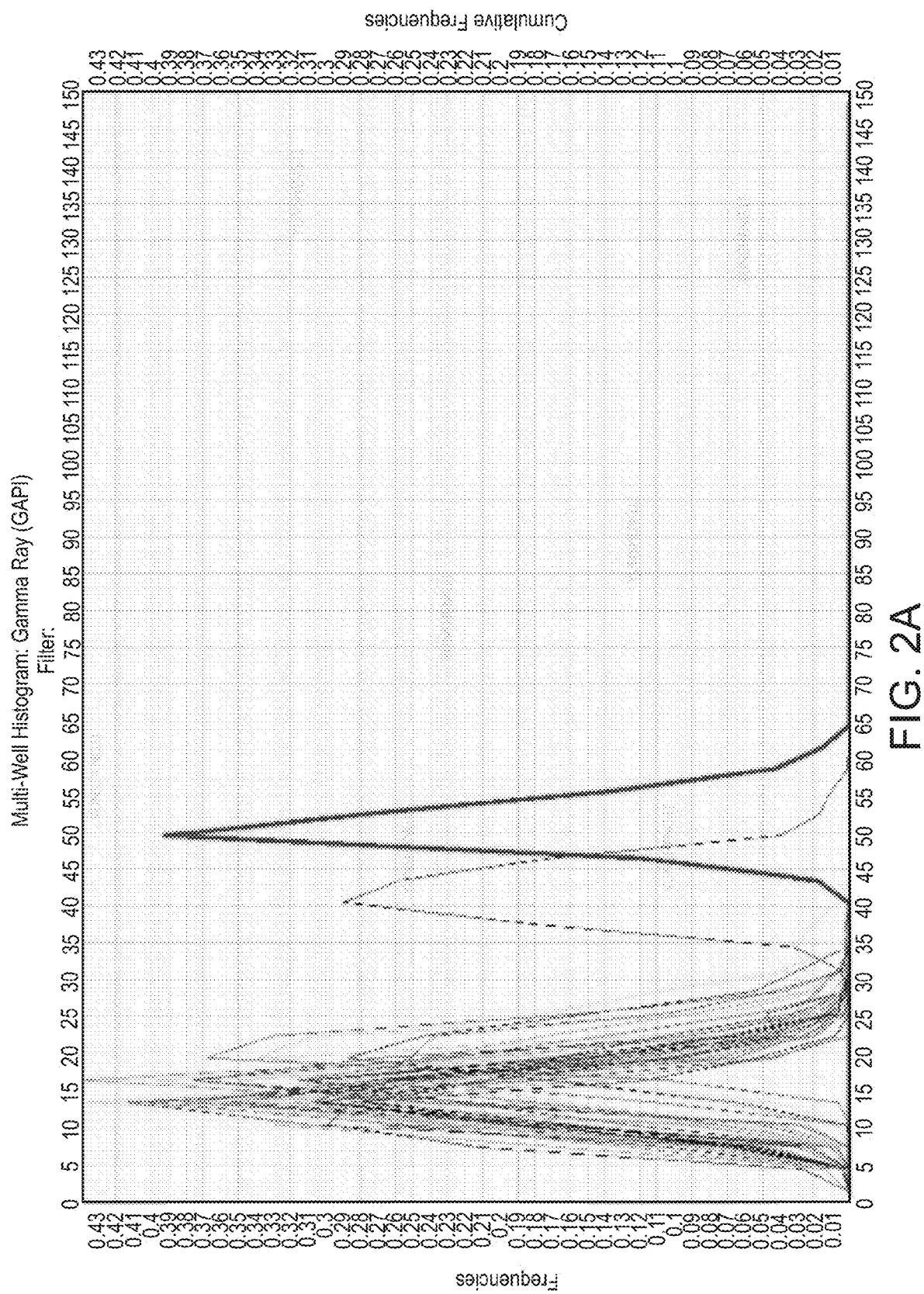
FIG. 2A is a histogram of Gamma Ray log curves before normalization.
Figure 2B:
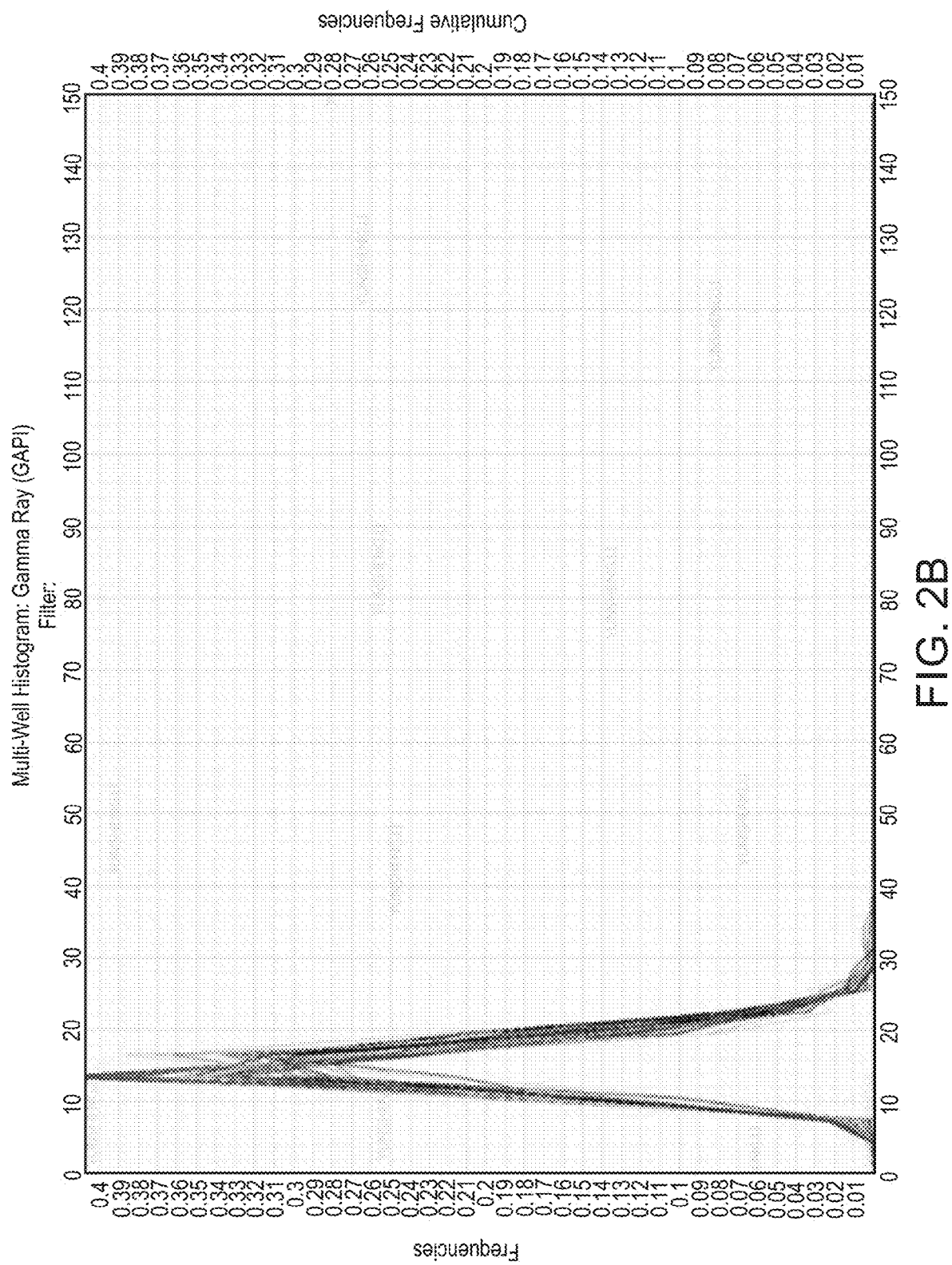
FIG. 2B is the histogram of Gamma Ray log curves after normalization.

In examples, the log curves are prepared by normalizing the log curves. FIG. 2A is a histogram of Gamma Ray log curves before normalization and FIG. 2B is the histogram of Gamma Ray log curves after normalization. The normalization aligns the histogram distribution to a normal distribution. In some embodiments, histograms of well log curves from multiple wells in the current zone are evaluated to determine if the log curves are to be normalized. Normalization makes two or more distributions identical in statistical properties. Gamma Ray log curves are easily affected by the logging environment. Normalization enables Gamma Ray log curves for multiple wells to be identical in statistical properties. The normalization reduces error introduced when training the machine learning models using the gamma ray log curves. In examples, normalization can be done with any data processing tool which provides normalization, such as quantile normalization, mean normalization, and the like.

Referring again to FIG. 1B, at block 124, unsupervised machine learning model building is selected for the current zone. In some embodiments, the input data available from the data preparation is used to determine the inputs for the unsupervised machine learning model. In examples, the input data is known well logs that exist for drilled wells. For example, in a well without one or two of the Gamma Ray (GR), Bulk Density (RHOB), or Neutron Porosity logs, available logs are used to train the machine learning models. In some embodiments, the predicted lithofacies (e.g., output) are defined by the sedimentologists based on the cored wells of the zone. In most scenarios there should be some cored wells in a zone, and the number of lithofacies in the zone can be easily defined using the available cores. For example, a zone in a newly developed oil and gas field should have some cored wells, and the number of the lithofacies can be determined based on the cored wells. If there are no cored wells in the zone, the number of lithofacies is estimated based on the outcrops or a nearby study area, field, or zone.

Figure 3:
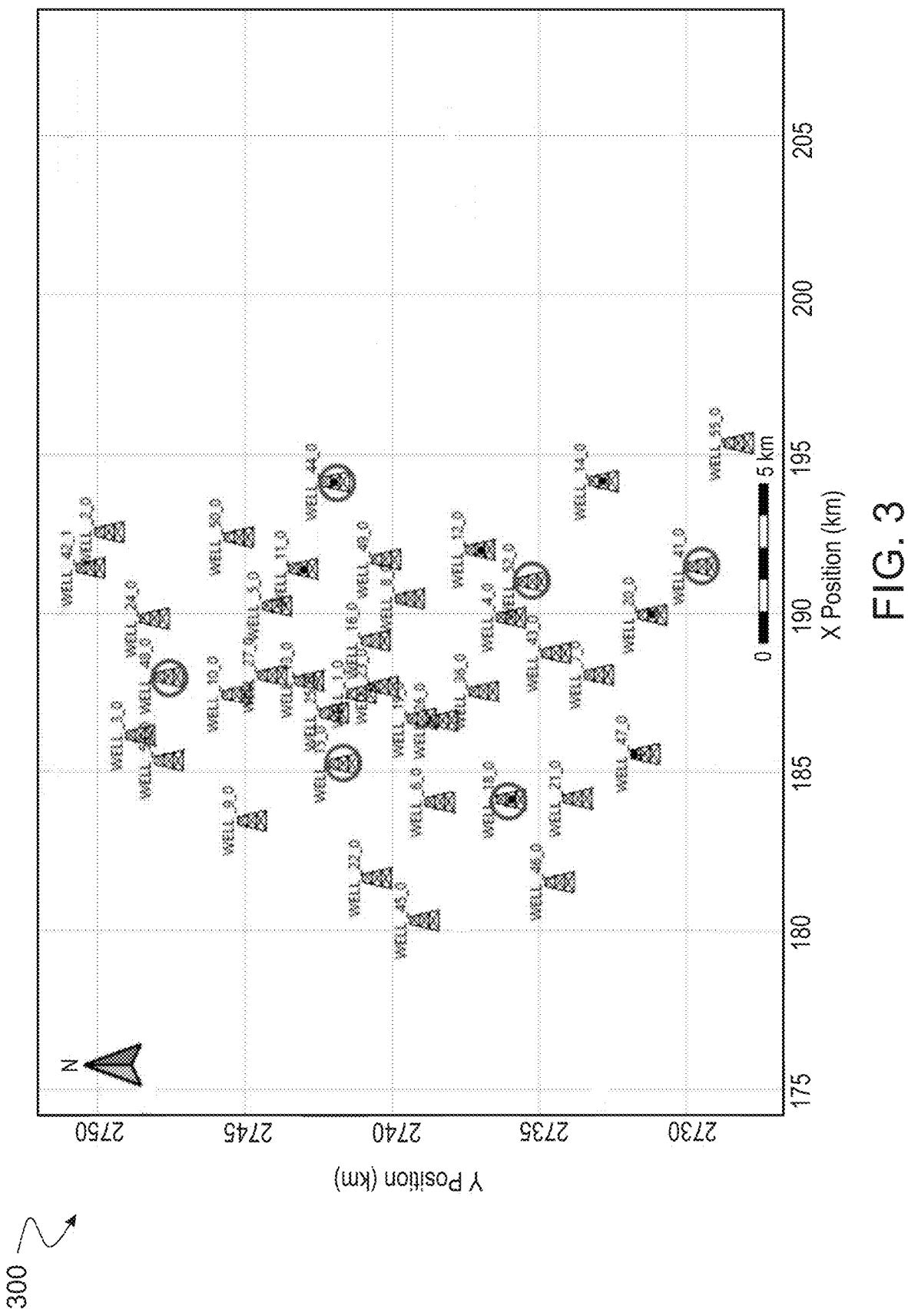
FIG. 3 shows the selection of the training wells which will be used to train the model.

At block 126, the machine learning models are trained for the current zone. The prepared log curves corresponding to one or more selected wells of the zone are provided as inputs to train the machine learning model. In some embodiments, the log curves are known log curves. By using known log curves, the input data is universal. Due to the universal input data, the present techniques can be used across any type of oil and gas field In some embodiments, training wells are selected based on the location and the quality of the log curves and core information. The training wells are located in key areas where most of the wells can be represented. For example, key areas are areas that represent distinct regions of the study field. Wells selected from these areas can represent most of the wells in the entire field. At the same time, it is better for training wells to have corresponding core data, which means they are cored wells. FIG. 3 shows the selection of the training wells which will be used to train the model. In FIG. 3, a well location map 300 illustrates a number of wells. The selected wells are shown with a red circle. A machine learning model is built and trained for each zone. After the model is trained it can be applied to all the wells in the zone to predict lithofacies.

Figure 4:
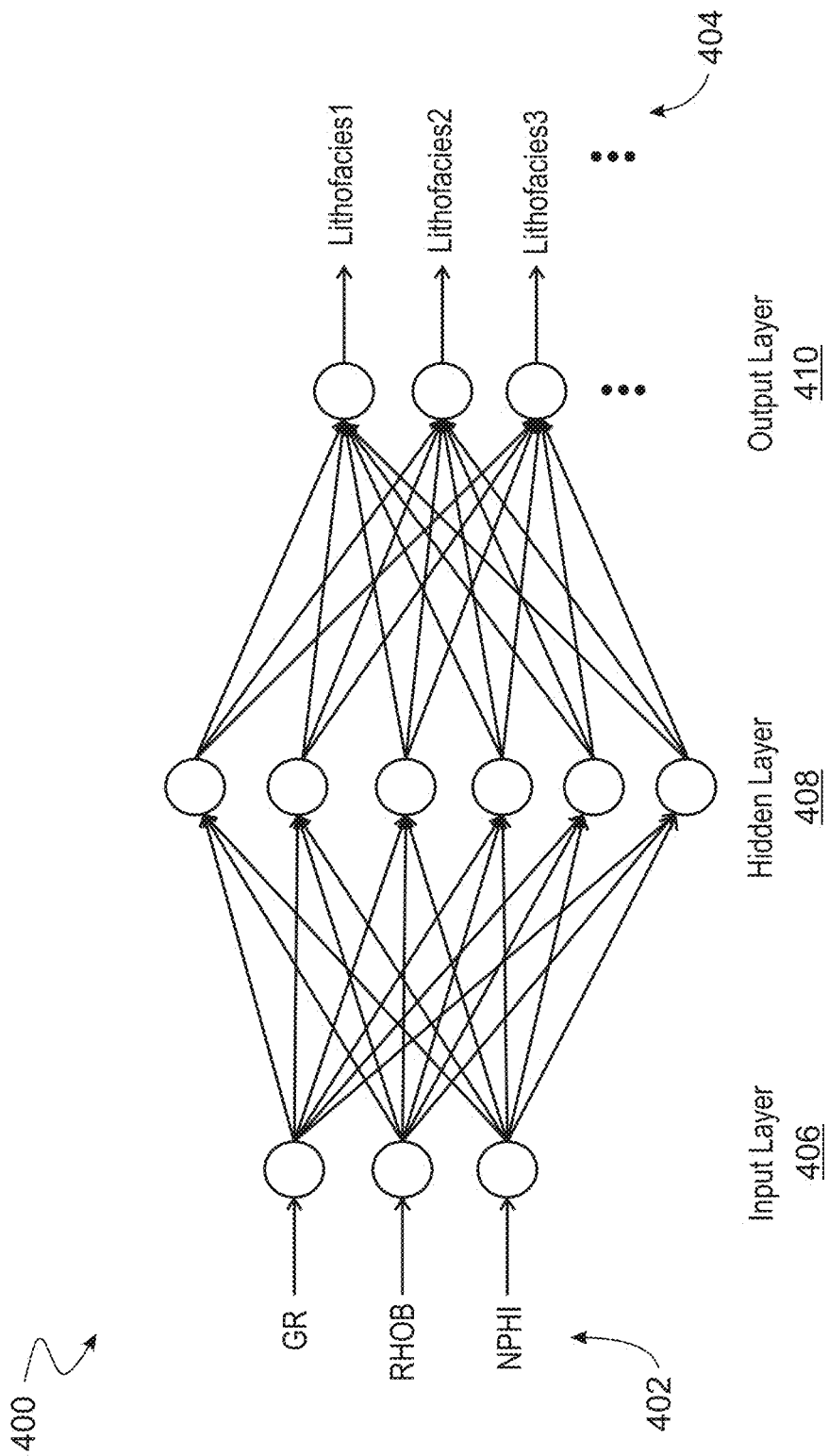
FIG. 4 shows a machine learning model.

At block 128, it is determined if the output of the machine learning models under training is consistent with the core data of the training wells. In this manner, the machine learning models output satisfactory predictions of lithofacies of the training wells. In examples, for similar log signatures the output should be similar and consistent with core data (if any). If they are very different the model parameters should be adjusted. During training, the machine learning models learn by inputting the well log curves and core data. The machine learning model recognizes patterns in lithofacies of the selected well. The unsupervised machine learning model learns from error in its output and corrects itself by updating model parameters, such as weights & biases. FIG. 4 shows a machine learning model 400. In FIG. 4, input data 402 includes log curves. The log curves are prepared as described with respect to the data preparation (e.g., data preparation 122 of FIG. 1B). The machine learning model 400 outputs a number of predicted lithofacies 404. The machine learning model 400 includes three layers of input neurons. The number of the neurons in each layer can be changed. The input layer 406 is based on the input data 402 and the output layer 410 is based on the number of the lithofacies 404 to be predicted. The number of neurons in the hidden layer 408 can be any, but it will affect the learning speed and accuracy.

If the machine learning models does not output a satisfactory prediction (e.g., error is below or equal to a predetermined threshold; the output of the machine learning models under training is no consistent with the core data of the training wells), process flow continues to 130. At block 130, the model parameters are modified, and machine learning model training continues. If the machine learning model outputs a satisfactory prediction (e.g., error is above a predetermined threshold; the output of the machine learning models under training is consistent with the core data of the training wells), process flow continues to block 132. At block 132, the next zone is selected. Process flow returns to block 122 where data preparation occurs for the next zone, and the unsupervised machine learning model building occurs for the next zone. In this manner, a number of machine learning models are trained for multiple zones of a formation. Training is complete when machine learning models have been trained for all zones.

Referring again to FIG. 1A, at block 104, once the machine learning models are trained for each zone, the machine learning models are applied to respective wells for each zone. For each well, one or more predicted lithofacies is determined. For ease of description, the predicted lithofacies are described as being shallow water deposit, medium water deposit, and deep water deposit. However, any type of lithofacies can be predicted.

At block 106, two-dimensional (2D) pie chart mapping is performed. In some embodiments, 2D log signature and pie-chart mapping are used to visualize the lithofacies change across the field. The 2D log signature map clearly shows lateral changes in the lithofacies, and patterns in the vertical lithofacies at each well location. A 2D pie-chart map displays the overall lithofacies association and a percentage of each lithofacies within the zonation at each well location. In some embodiments, the pie chart mapping be used for well grouping, and consequently for unique core description.

Figure 5:
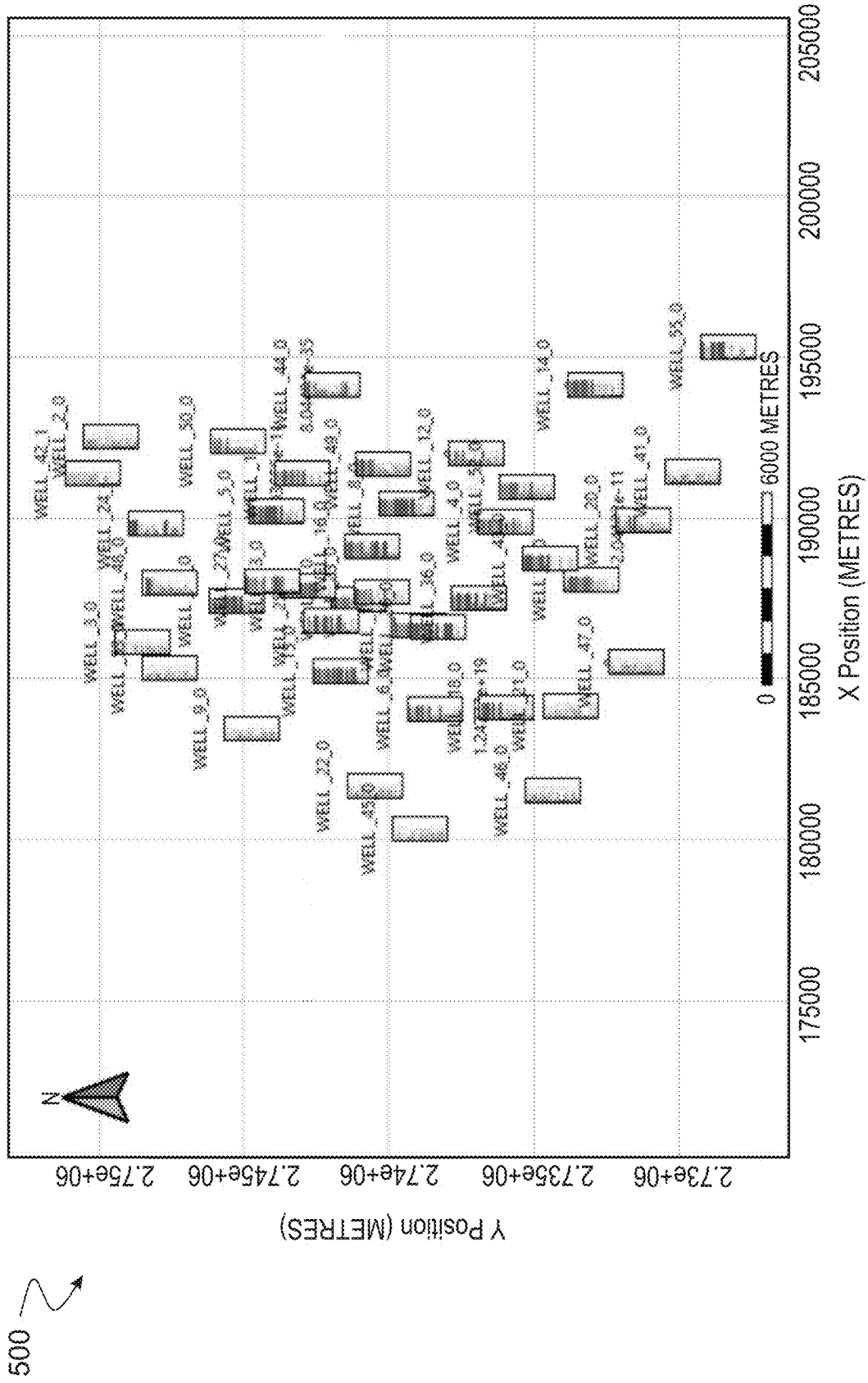
FIG. 5 shows a two-dimensional (2D) log signature map of a vertical pattern at each well location.

FIG. 5 shows a 2D log signature map 500 of a vertical pattern at each well location. The vertical patterns at each well location correspond to the predicted lithofacies. As shown in FIGS. 5-19, red indicates a shallow water deposit, yellow indicates a medium water deposit, and blue indicates a deep water deposit. For the predicted lithofacies, variations within each color family show the relative fluctuations in each lithofacies. Thus, in FIG. 5-19, the cold color legend includes blue, light blue, green, etc. The cold colors represent a relatively deep water deposit. The hot color legend includes yellow, orange, red, etc. The hot colors represent a relatively shallow water deposit. Sea level changes over time have resulted in deep water deposits to shallow water ones with some fluctuations.

Figure 6:
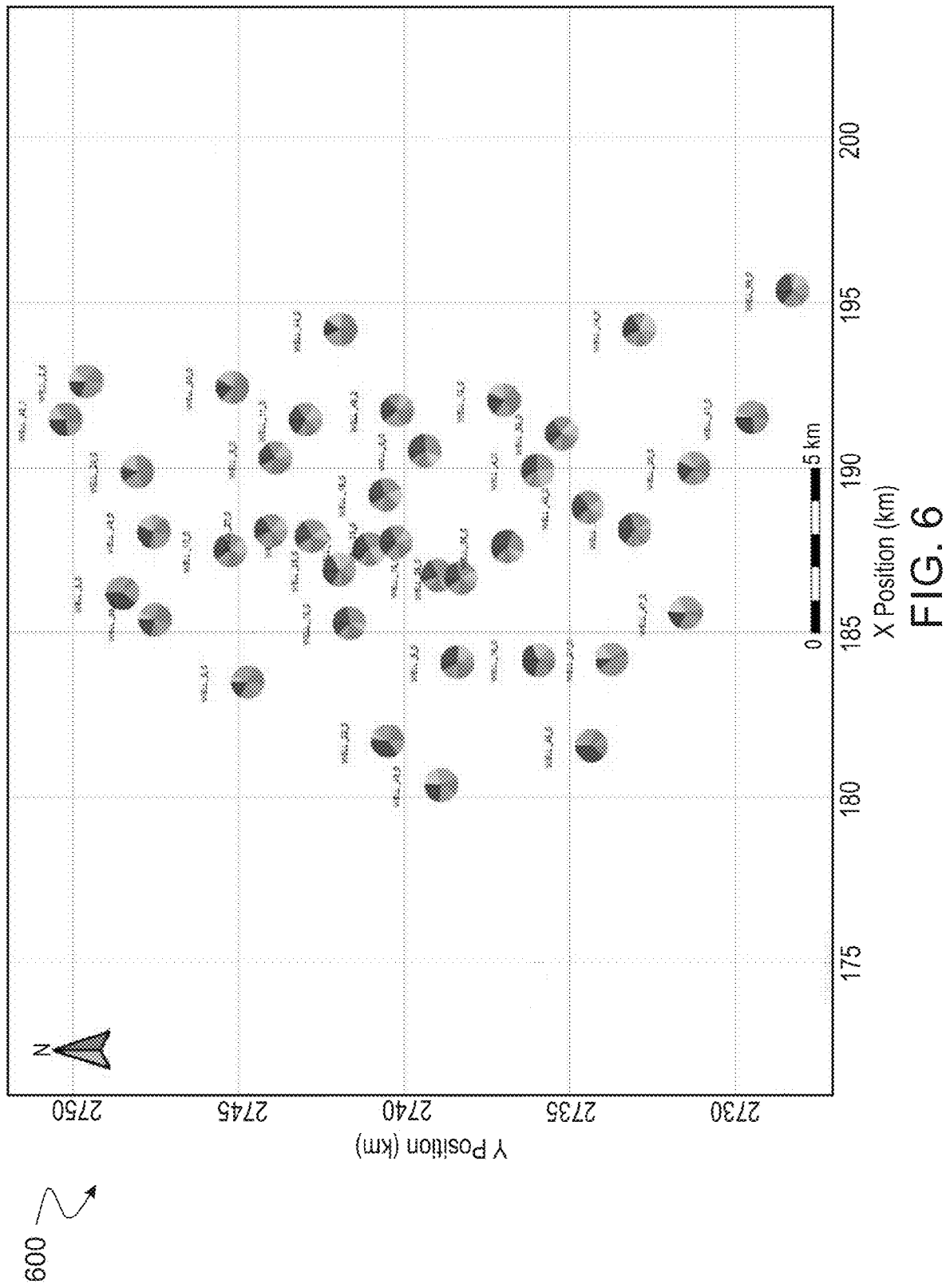
FIG. 6 shows a 2D lithofacies pie-chart map.
Figure 7:
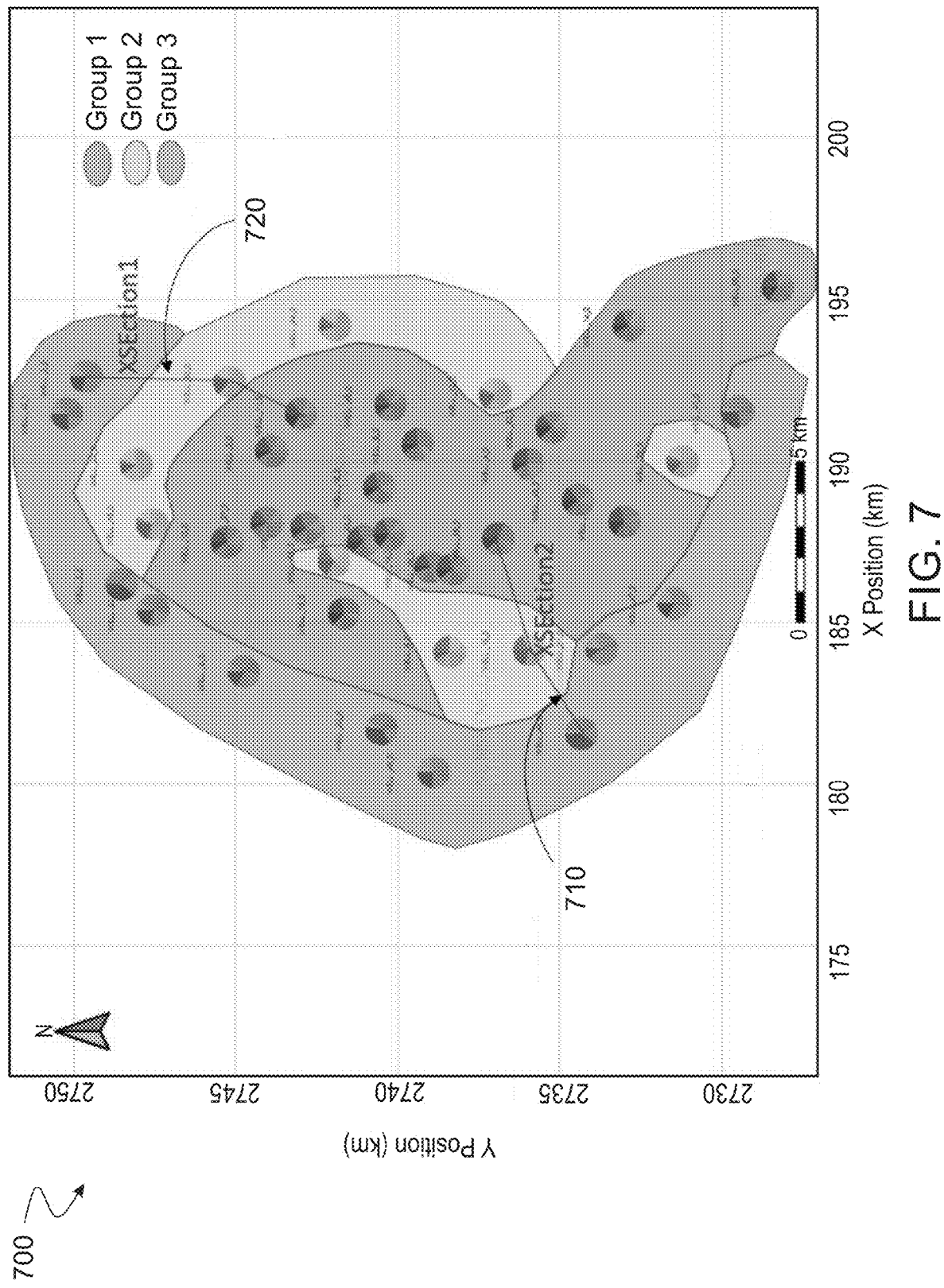
FIG. 7 shows well grouping based on 2D pie-chart mapping.

FIG. 6 shows a 2D lithofacies pie-chart map 600. In the pie chart map 600, the overall percentage of each lithofacies type at each well location is illustrated. In this 2D map, each pie-chart represents the percentage of each lithofacies present for a respective well. One color represents one lithofacies. From this lithofacies pie-chart map, trends across in the zones are observed. Based on the trends, the wells can be divided into three groups as shown in FIG. 7.

Referring again to FIG. 1A, at block 108 well grouping is performed. Well grouping is based on the existence of specific lithofacies and their percentages with respect to each well. FIG. 7 shows well grouping based on 2D pie-chart mapping. In the example of FIG. 7, in Group 2 there is no orange color, and the hot color is less than 25% of the total predicted lithofacies for the wells. In Group 3, there is almost no hot color for the predicted lithofacies for the wells (e.g., only a few wells with very small amount of hot color). In some embodiments, the threshold percentages are determined based on the existence and the percentage of certain lithofacies. For example, the threshold percentages are based on the percentages of particular lithofacies with hot or cold colors. In this example, inclusion in Group 1 is based on a threshold that the hot color is more than 25% of the total lithofacies, and one of the lithofacies is an orange color. In examples, the existence of orange color is a key identification of a well in Group 1. Similarly, inclusion in Group 3 is based on a threshold that the cool color is more than 25% of the total lithofacies, and one of the lithofacies is a blue color. In examples, the existence of the blue color is a key identification of a well in Group 3. Inclusion in Group 2 is based on a lack of inclusion in Group 1 or Group 2. That is, the hot color is less than 25% of the total lithofacies and the cool color is less than 25% of the total lithofacies. The percentages and groups described are for exemplary purposes. The present techniques can distinguish between groups based on any predetermined percentage of facies for each group. Moreover, any number of groups can be identified.

Figure 8:
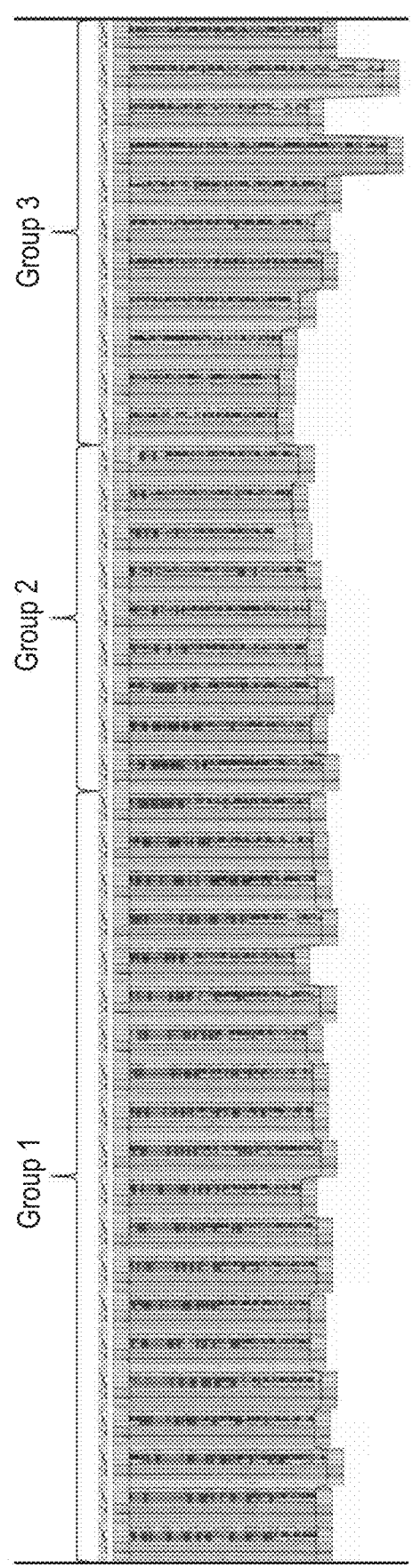
FIG. 8 shows a cross-section layout of all the wells in the map with different grouped colors.
Figure 9:
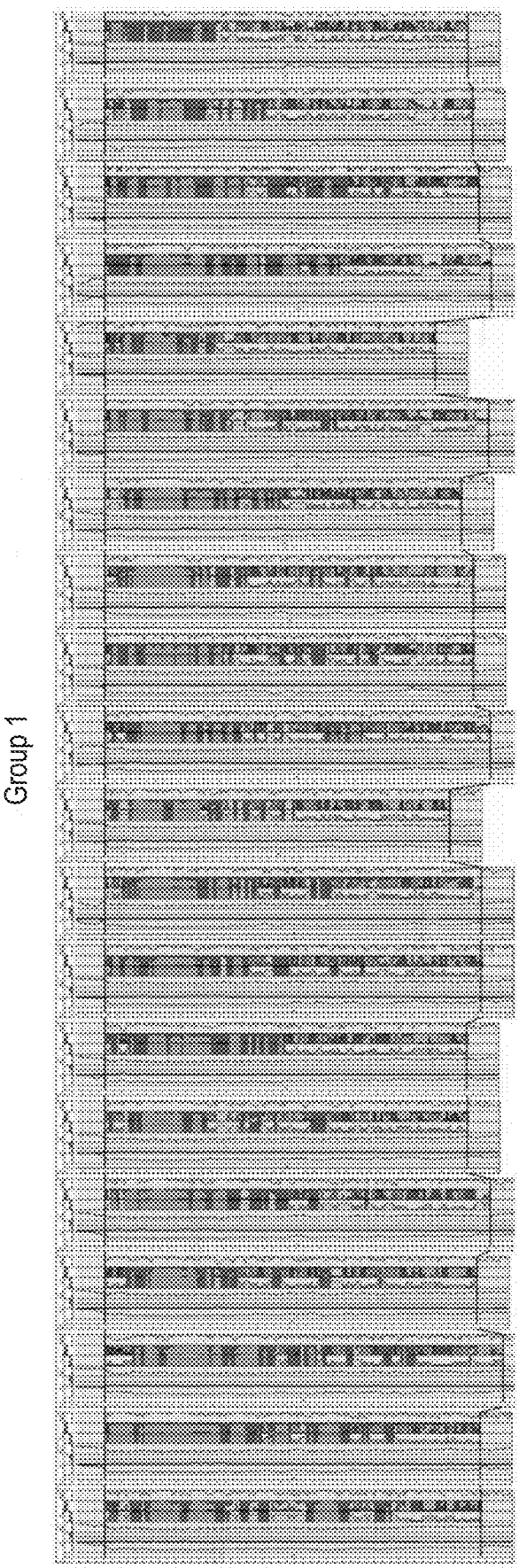
FIG. 9 shows predicted lithofacies for wells in Group 1.
Figure 10:
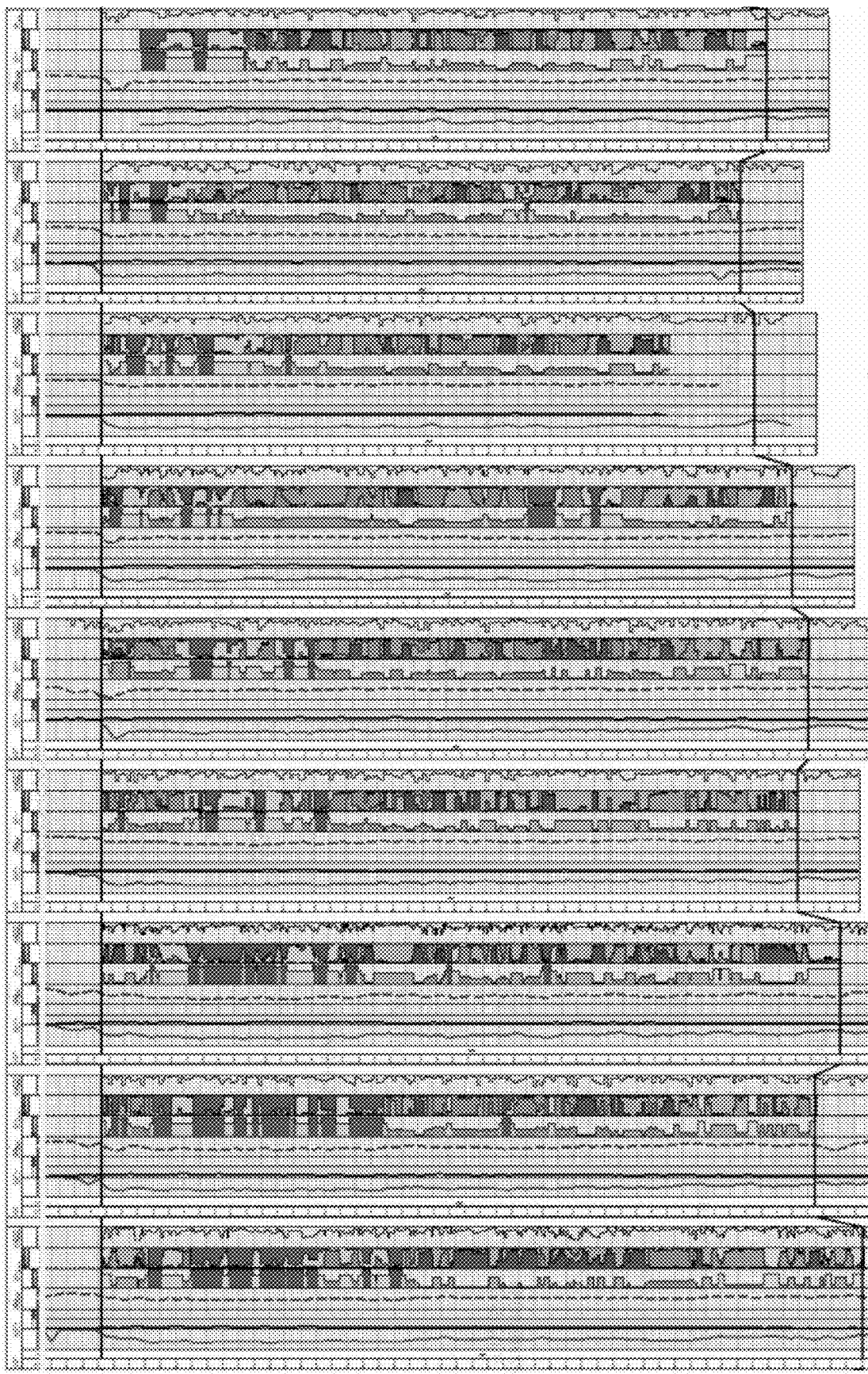
FIG. 10 shows predicted lithofacies for wells in Group 2.
Figure 11:
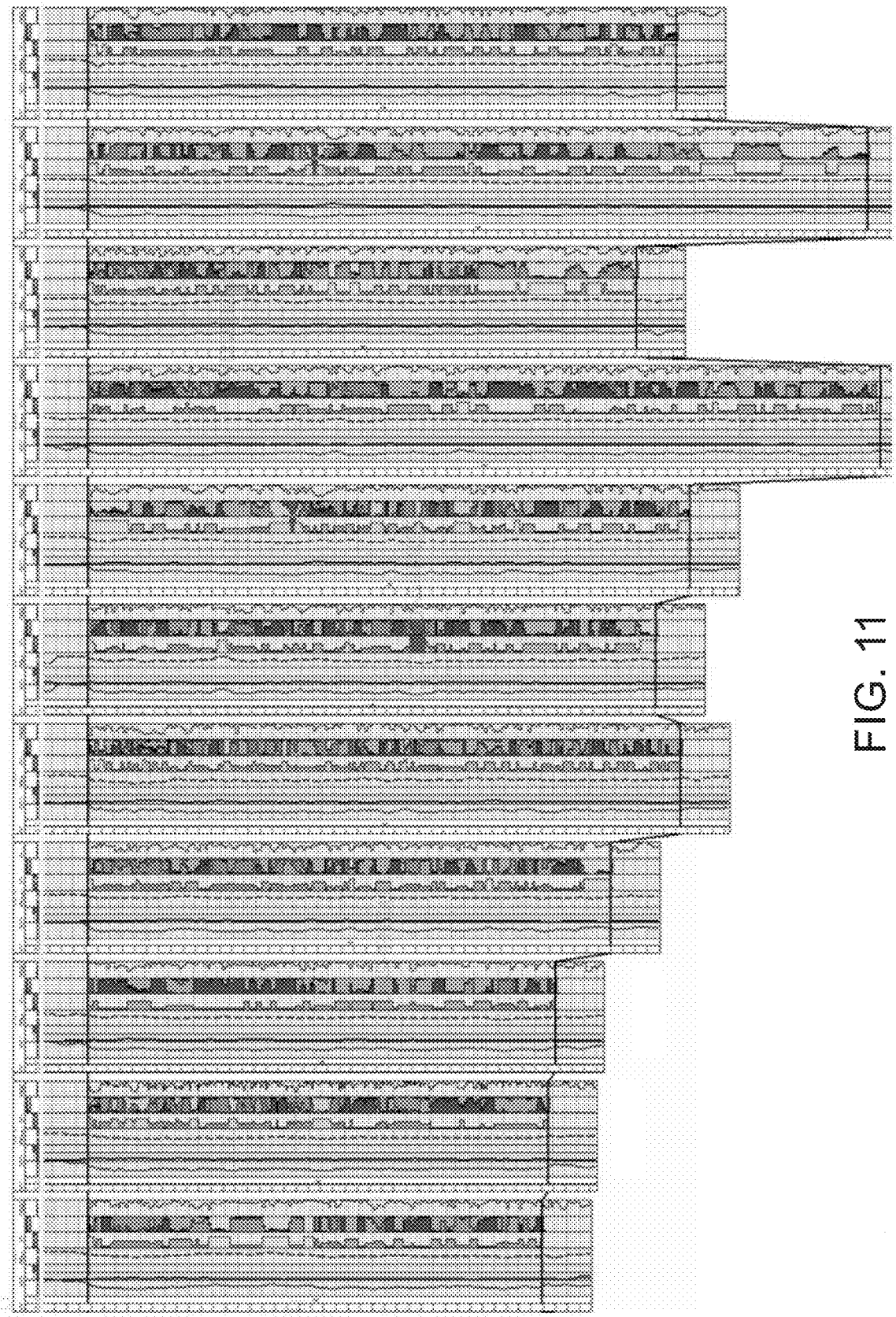
FIG. 11 shows predicted lithofacies for wells in Group 3.

Well grouping places wells into groups based on the distribution of the predicted lithofacies along the wellbore. Machine learning models are trained and applied to all the wells in the study area and the final result of predicted lithofacies are used to group wells. In FIG. 7, cross sections 710 and 720 are selected by the user. A first cross section 710 is from north to south, and a second cross section 720 is from east to west. The cross sections show lithofacies changes between different groups across the field as provided in FIGS. 12 and 13. FIG. 8 shows a cross-section layout of all the wells in the map with different grouped colors. After well grouping, the wells in the 2D map can be sorted based on the groups as illustrated in FIG. 8. FIGS. 9-11 show predicted lithofacies for each group. In FIGS. 9-11, each group is separated to show more details for each respective group. As shown in FIGS. 9-11, the predicted lithofacies in each group are different. In FIG. 9, the dominate facies for Group 1 are the facies with hot color (e.g., brown and red) except the lower part of the wells. In FIG. 11, the dominate facies for Group 3 are facies with a cold color (e.g., blue and green). In FIG. 10, the dominate facies of Group 2 is somewhere in between that of Group 1 and Group 3.

Referring again to FIG. 1A, at block 110 depositional environment categorization is performed. The depositional environment trend is determined through 2D lithofacies pie-chart map 600 of FIG. 6 and the cross sections 710 and 720 over different groups as illustrated in FIG. 7. Depositional trends are observed from different directions as shown by the cross sections from FIG. 7. In some embodiments, depositional environments are characterized by their sedimentary lithology, sedimentary structures, paleo-current patterns and fossils. The classification of depositional environments is very important in reservoir characterization. The classification is used to discover the distribution of each lithofacies within the study area.

Figure 12:
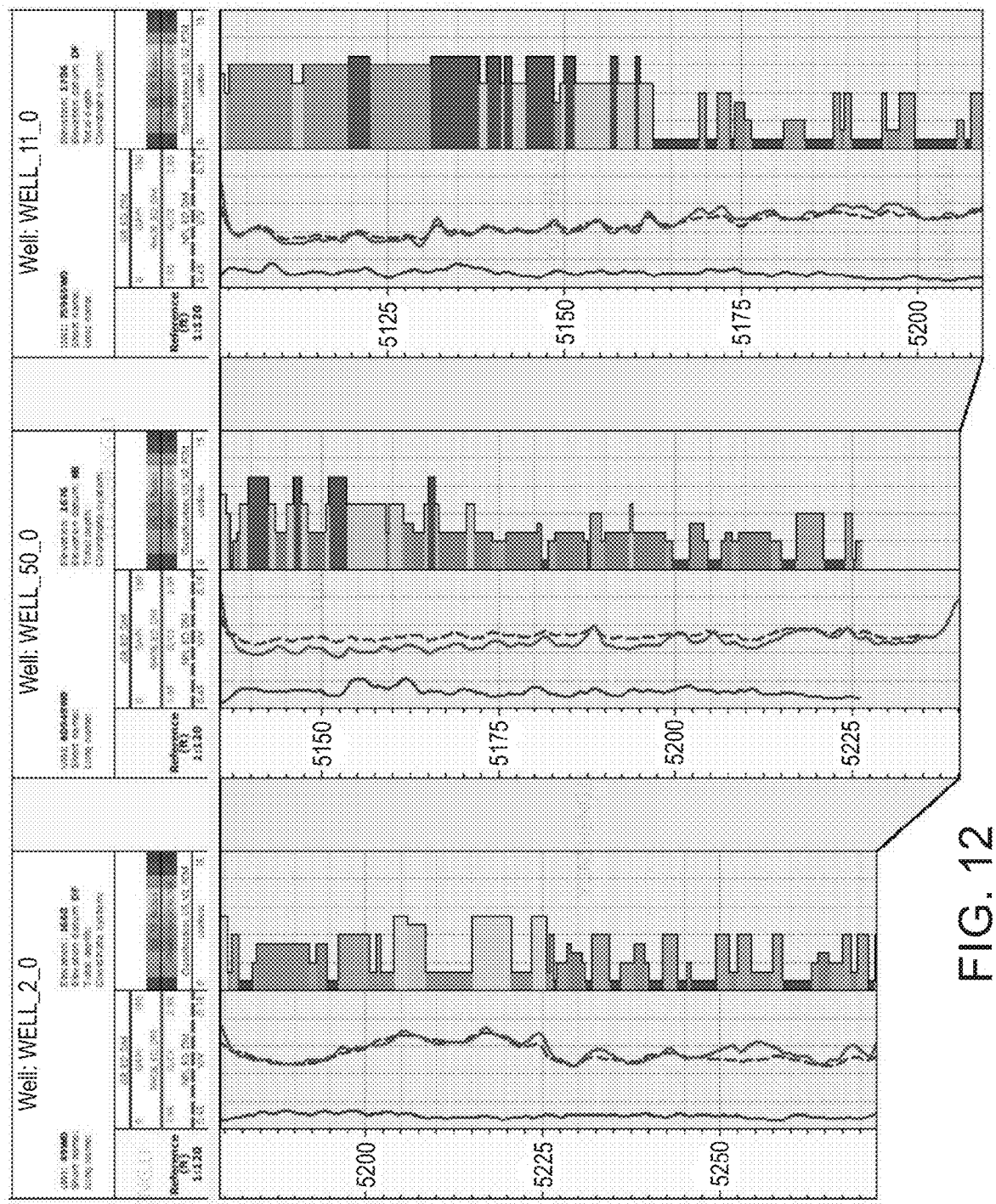
FIG. 12 shows a north-south cross section of three wells in FIG. 7.
Figure 13:
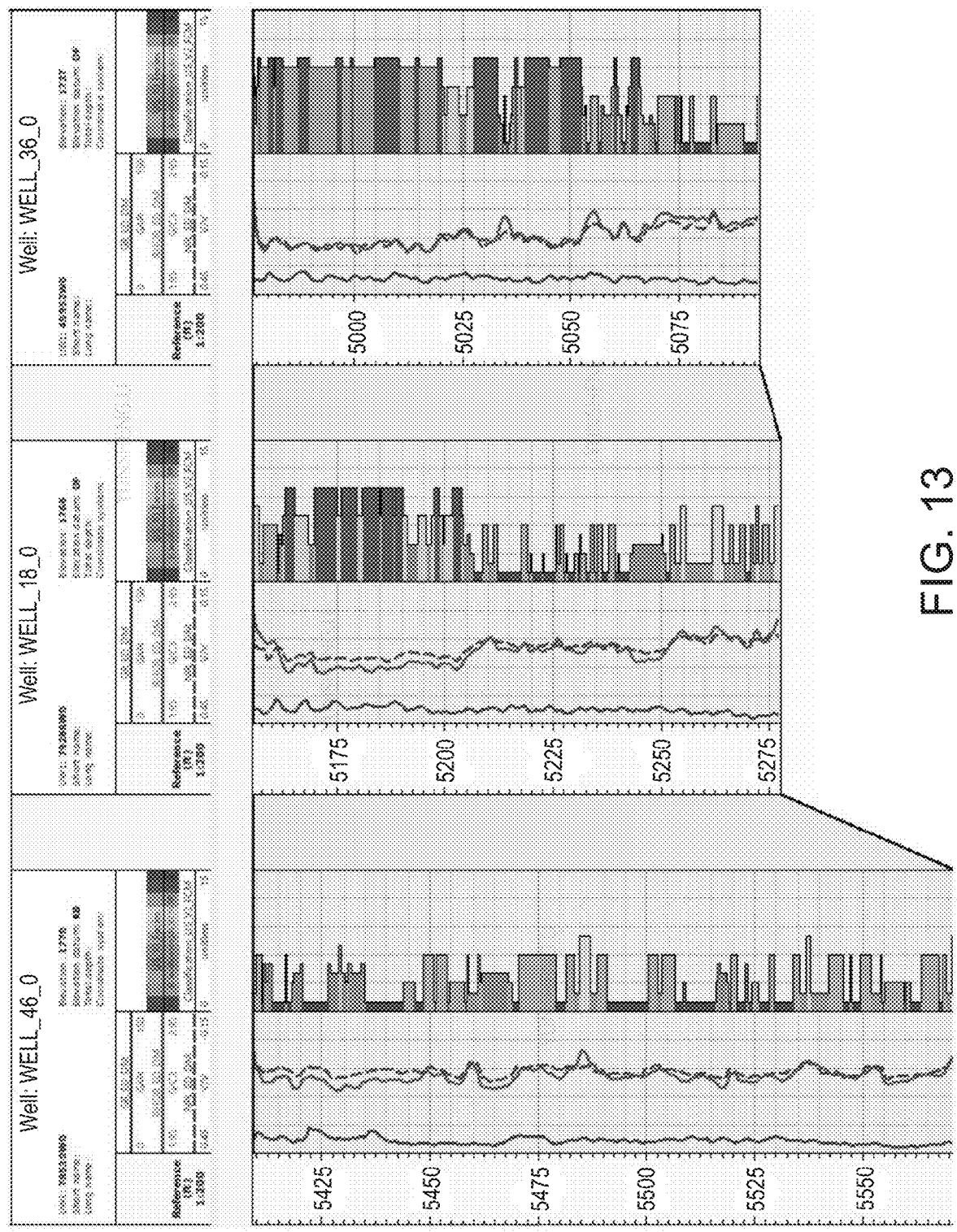
FIG. 13 shows an east-west cross section of three wells in FIG. 7.

In order to show the depositional trend from different directions, two cross sections were created from different directions. A first cross section 710 a substantially north to south cross section, and the second cross section 720 is a substantially east to west cross section shown in FIG. 7. FIG. 12 shows the north-south cross section 710 of three wells in FIG. 7: well_2_0, well 50_0, and well_11_0. FIG. 13 shows an east-west cross section 720 of three wells in FIG. 7: well_46_0, well_18_0, and well_36_0. The cross sections in FIG. 12 and FIG. 13 show the lithofacies and lithofacies association change, which reflects the depositional environment change. Both FIG. 12 and FIG. 13 shows the depositional environment change from deep water to medium and shallow water from west to east (FIG. 12) and north to south (FIG. 13).

Referring again to FIG. 1A, at block 112, guided core description is performed. For example, corrections to core descriptions are made manually by a user based on the predicted lithofacies. The predicted lithofacies serve as a guideline, and can be used to update core descriptions made by other users in the past. These old core descriptions can have different descriptions based on the persons that created the core descriptions. The present techniques enable a quick overview of depositional trends and predicted lithofacies patterns for an area to help users quickly understand lithofacies distribution across the field. Core descriptions which were not properly described before are determined based on the depositional trends and predicted lithofacies patterns for the area.

The block diagram of FIG. 1A is not intended to indicate that the workflow 100 is to include all of the components shown in FIG. 1A. Rather, the workflow 100 can include fewer or additional components not illustrated in FIG. 1A (for example, additional models, additional data, and the like). The workflow 100 may include any number of additional components not shown, depending on the details of the specific implementation. Furthermore, any of the functionalities of the workflow 100 may be partially, or entirely, implemented in hardware and/or in a processor. For example, the functionality may be implemented with an application specific integrated circuit, in logic implemented in a processor, in logic implemented in a specialized graphics processing unit, or in any other device.

FIGS. 14-19 show core description correction. Core data is important because it establishes a ground truth for each well. However, the core descriptions are usually described by different people at different times, and are inconsistent in terms of lithofacies and depositional environments. The present techniques enable a systematic evaluation of core descriptions. This greatly improves the accuracy and efficiency of core description, and is especially helpful for full filed reservoir characterization and description.

Figure 14:
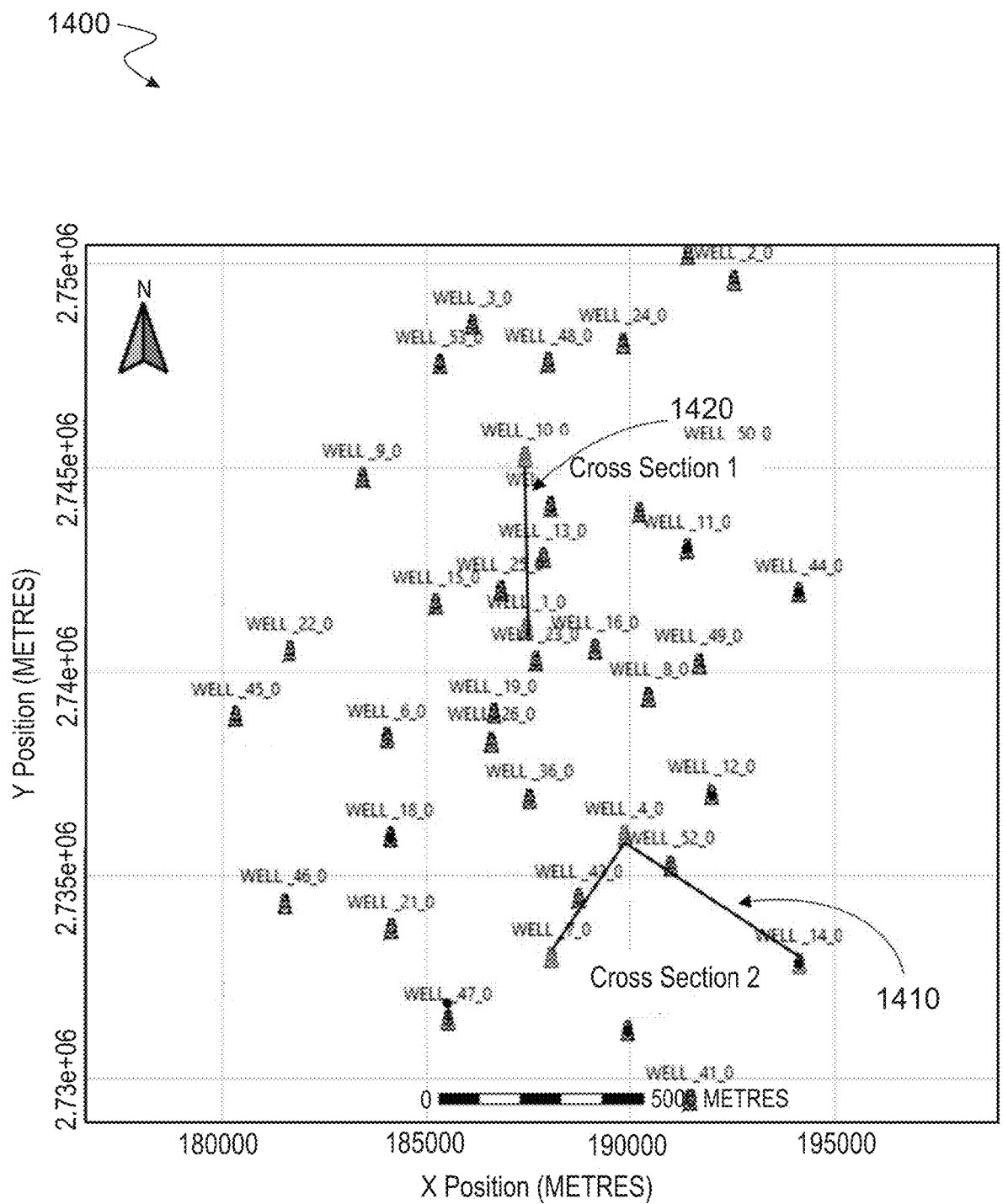
FIG. 14 shows a map of wells with two cross sections.
Figure 15:
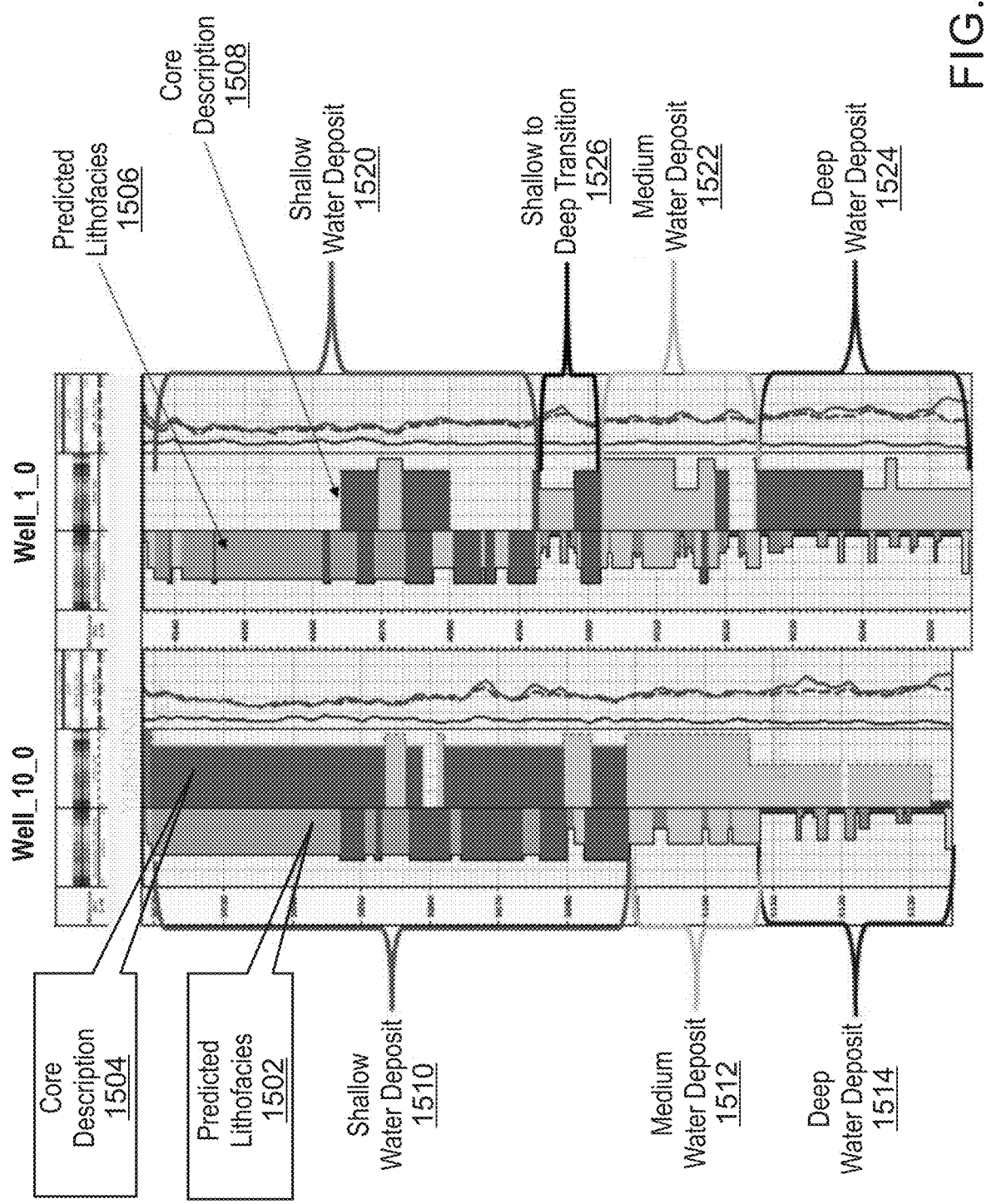
FIG. 15 shows predicted lithofacies and core descriptions for wells from FIG. 14.

FIG. 14 is a map of wells with two cross sections. A first cross section 1410 includes well_10_0 and well_1_0. A second cross section 1420 includes well_7_0, well_52_0, and well_14_0. FIG. 15 shows predicted lithofacies and core descriptions for well_10_0 and well_1_0, corresponding to the first cross section 1410 of FIG. 14. For well_10_0, predicted lithofacies 1502 and core description 1504 are illustrated. Additionally, the well_10_0 has lithofacies that include a shallow water deposit 1510, medium water deposit 1512, and deep water deposit 1514. For well_1_0, predicted lithofacies 1506 and core description 1508 are illustrated. Additionally, the well_1_0 has lithofacies that include a shallow water deposit 1520, medium water deposit 1522, and deep water deposit 1524. For well_1_0, a shallow to deep transition 1526 is illustrated.

Figure 16:
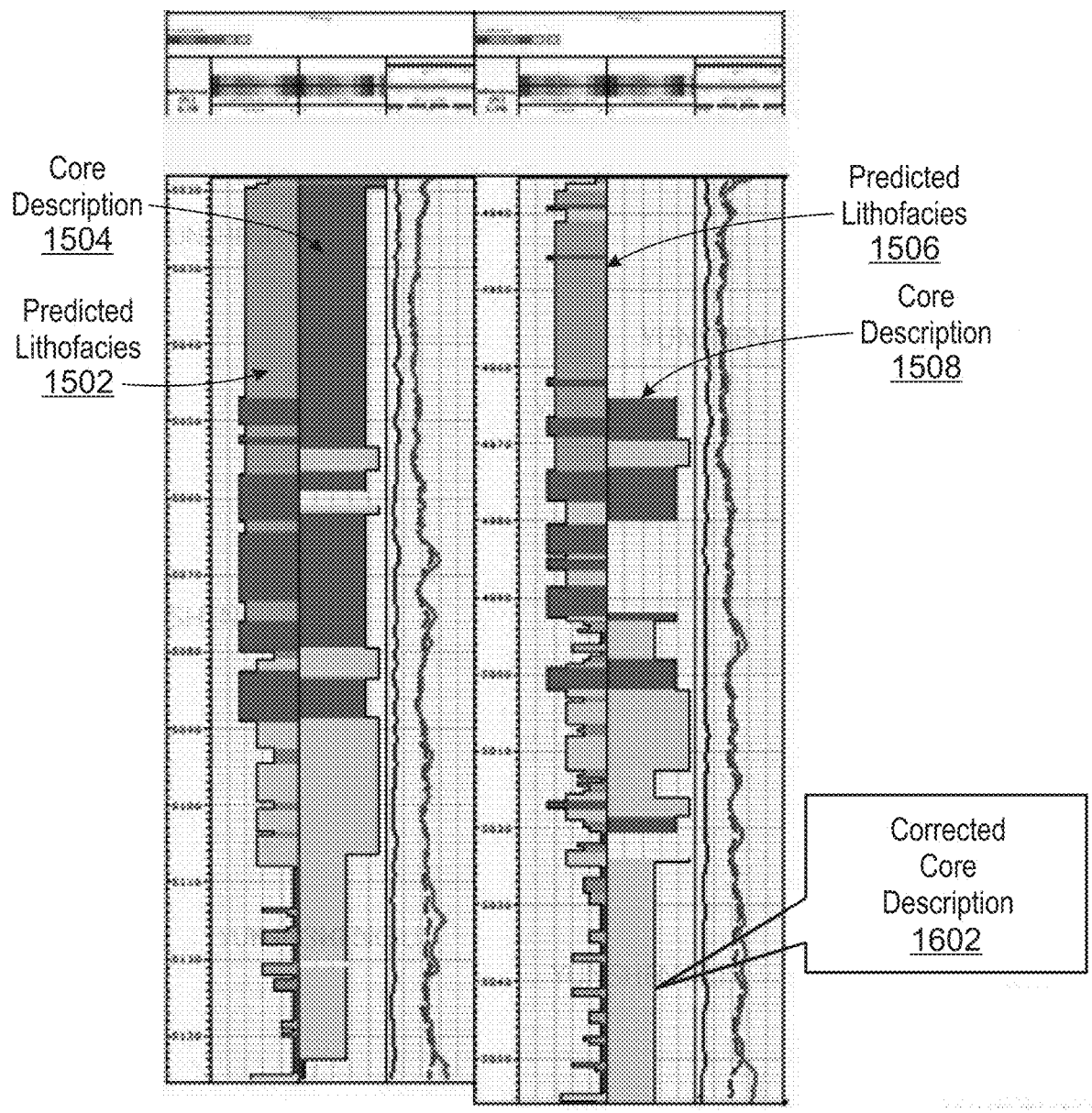
FIG. 16 shows a corrected core description for wells from FIG. 15.

For each of well_10_0 and well_1_0, the respective core descriptions 1504 and 1508 fail to follow a same depositional environment trend. In FIG. 15, there is a large difference of the core descriptions 1514 and 1524 in the lower part of both wells. From the predicted lithofacies 1502 and 1506, the lower part of both wells should belong to the same depositional environment (deep water deposit) but there is a large difference between the core descriptions. In particular, well_10_0 shows a yellow, medium water deposit while well_1_0 shows two additional deposits (red and pink). Based on the similar predicted lithofacies between the wells, the disagreement between the core descriptions 1504 and 1508 are logically inconsistent. Thus, a core description should be corrected. In examples, a user to double checks or re-evaluates disagreements between core descriptions and predicted lithofacies. FIG. 16 shows a corrected core description for wells from FIG. 15. In the example of FIG. 16, the core description for well_1_0 is corrected. The corrected core description 1602 is based on trends in the depositional environment as derived from the predicted lithofacies.

Figure 17:
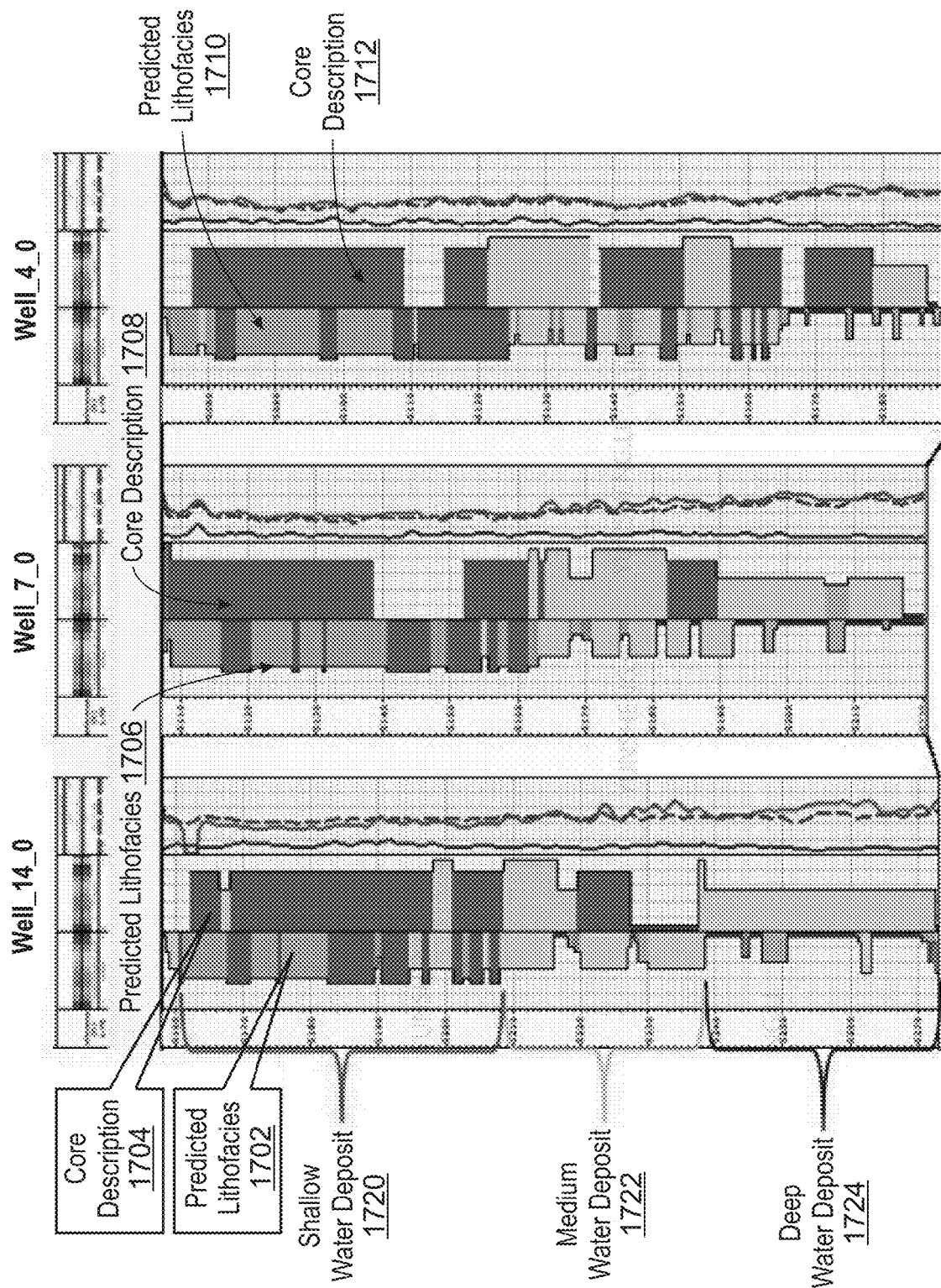
FIG. 17 shows predicted lithofacies and core descriptions for three wells.

FIG. 17 shows predicted lithofacies and core descriptions for well_14_0, well_7_0, and well_4_0, corresponding to the second cross section 1420 of FIG. 14. For well_14_0, predicted lithofacies 1702 and core description 1704 are illustrated. For well_7_0, predicted lithofacies 1706 and core description 1708 are illustrated. For well_4_0, predicted lithofacies 1710 and core description 1712 are illustrated. The wells in FIG. 17 generally includes lithofacies that include a shallow water deposit 1720, medium water deposit 1722, and deep water deposit 1724.

Figure 18:
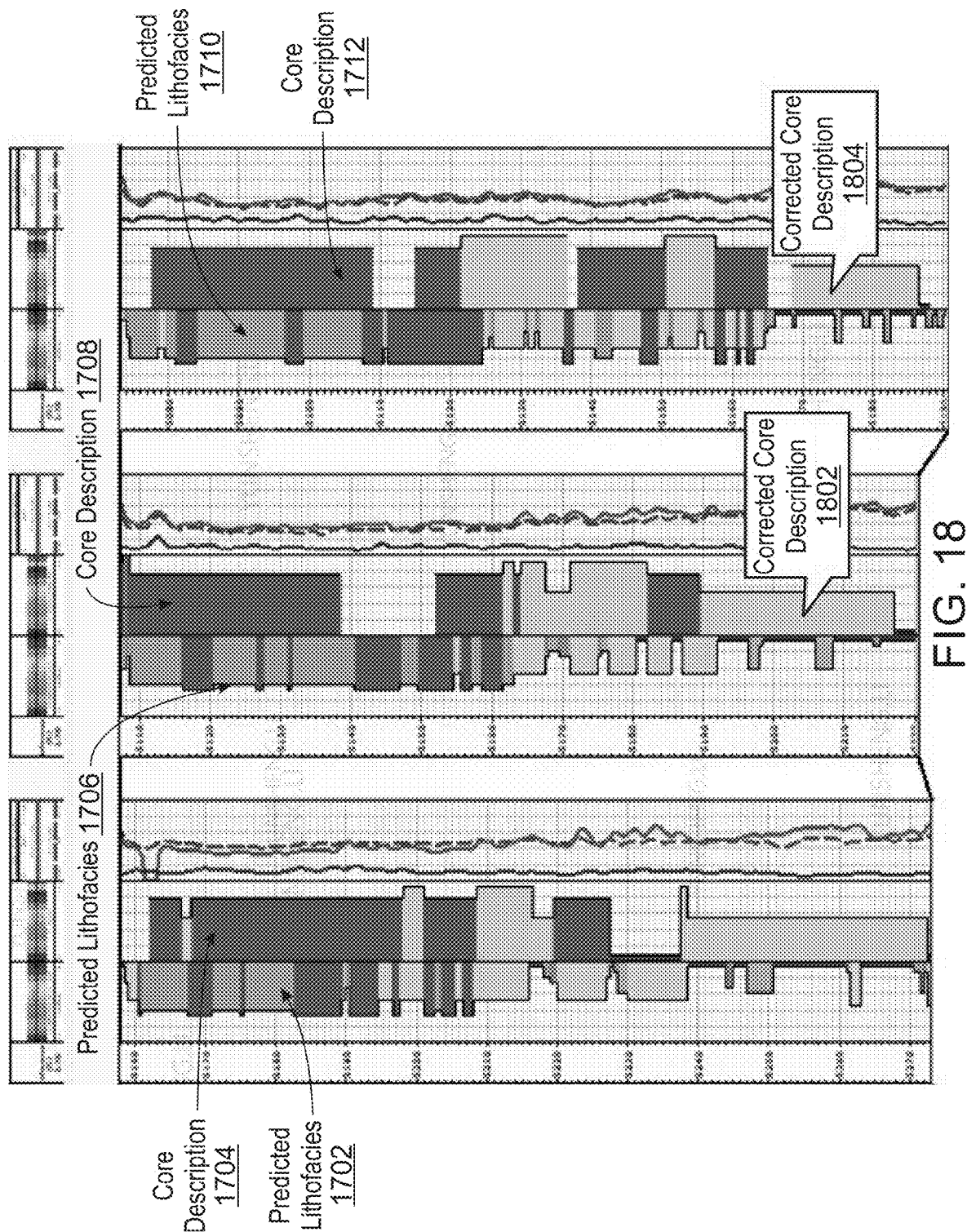
FIG. 18 shows a corrected core description for wells from FIG. 17.

In the example of FIG. 17, a comparison across the well_14_0, well_7_0, and well_4_0 is provided. For the deep water deposit, the respective predicted lithofacies 1702, 1706, and 1710 are similar. However, the corresponding core descriptions 1704, 1708, and 1712 are dissimilar. For example, when comparing the deep water deposit 1724 across each well, the core description 1712 of well_4_0 contains red lithofacies and the core description 1708 of well_7_0 contains some green lithofacies. Both need to be corrected to yellow lithofacies based on trends observed across the group. For example, the predicted lithofacies of the three wells in the second cross section (FIG. 17) should have similar depositional environments because they are in the same group, especially the bottom part (deep water deposit). Well_14_0 shows good deep water deposit at the bottom, so a reasonable assumption is that the core description for well_14_0 is correct. In some embodiments, if there are doubts about the reasonable assumption of the lithofacies in the core description, sedimentologists will double check the core description. The core description 1712 for well_4_0 and the core description 1708 for well_7_0 are corrected based on the observed trend for the second cross section, as evidenced by well_14_0. FIG. 18 shows a corrected core description for wells from FIG. 17. In the example of FIG. 18, the core description for well_7_0 and well_4_0 are corrected. The corrected core descriptions 1802 and 1804 are based on trends in the depositional environment as derived from the predicted lithofacies.

Figure 19:
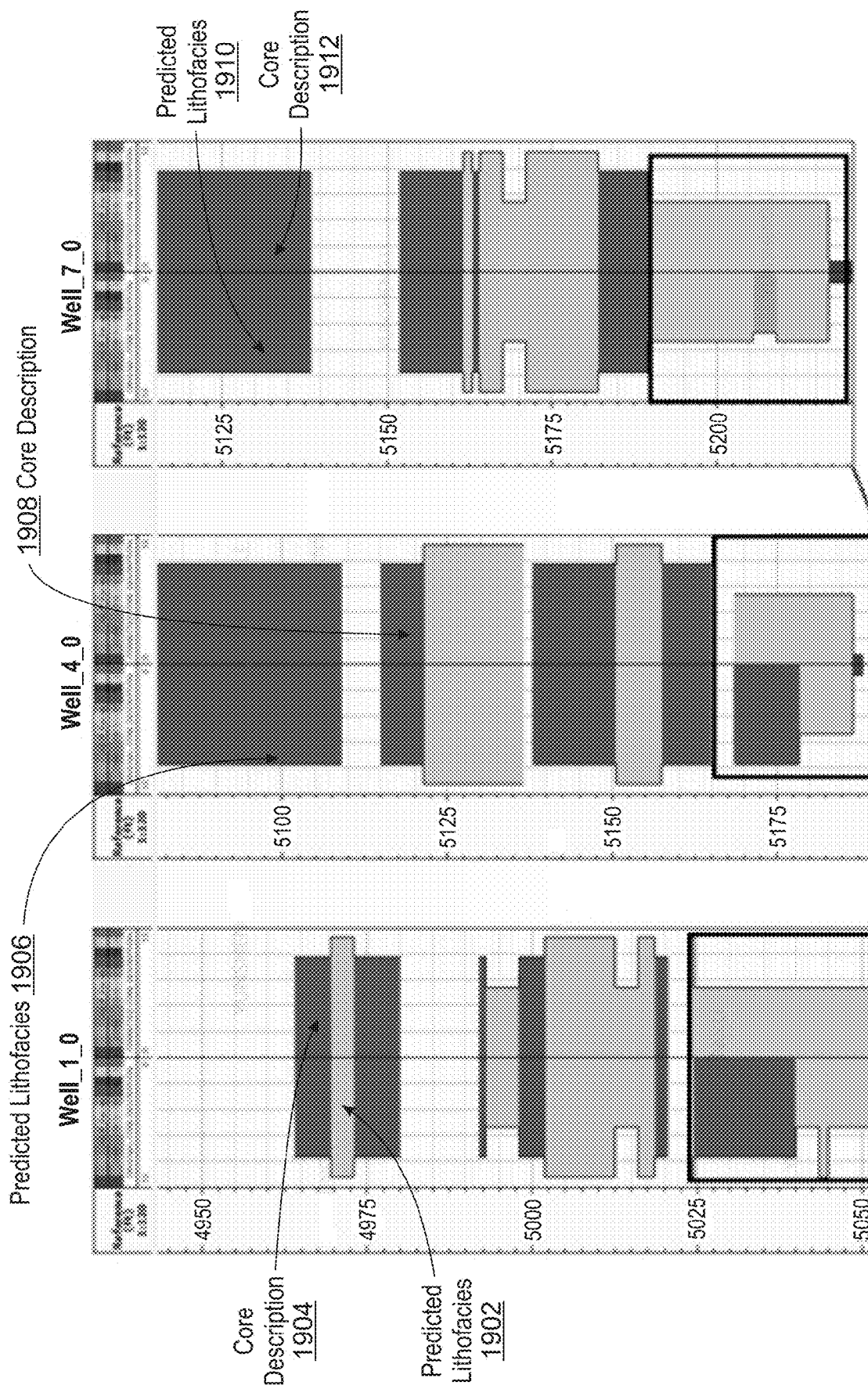
FIG. 19 shows a log view display for three wells.

In some embodiments, the lithofacies are represented by codes. FIG. 19 shows predicted lithofacies and core descriptions for three wells. Predicted lithofacies 1902 and a core description 1904 are shown for well_1_0. Predicted lithofacies 1906 and a core description 1908 is shown for well_4_0. Predicted lithofacies 1910 and a core description 1912 is shown for well_7_0. FIG. 19 is a log view display for each well, and Table 1-3 provide the real value change in each well.

TABLE 1

Lithofacies Code Change in Well_1_0

| Well Name | DEPTH | Original Core Description | Corrected Core Description |
|---|---|---|---|
| WELL_1_0 | 5024 | 12 | 12 |
| WELL_1_0 | 5024.5 | 10 | 7 |
| WELL_1_0 | 5025 | 10 | 7 |
| WELL_1_0 | 5025.5 | 10 | 7 |
| WELL_1_0 | 5026 | 10 | 7 |
| WELL_1_0 | 5026.5 | 10 | 7 |
| WELL_1_0 | 5027 | 10 | 7 |
| WELL_1_0 | 5027.5 | 10 | 7 |
| WELL_1_0 | 5028 | 10 | 7 |
| WELL_1_0 | 5028.5 | 10 | 7 |
| WELL_1_0 | 5029 | 10 | 7 |
| WELL_1_0 | 5029.5 | 10 | 7 |
| WELL_1_0 | 5030 | 10 | 7 |
| WELL_1_0 | 5030.5 | 10 | 7 |
| WELL_1_0 | 5031 | 10 | 7 |
| WELL_1_0 | 5031.5 | 10 | 7 |
| WELL_1_0 | 5032 | 10 | 7 |
| WELL_1_0 | 5032.5 | 10 | 7 |
| WELL_1_0 | 5033 | 10 | 7 |
| WELL_1_0 | 5033.5 | 10 | 7 |
| WELL_1_0 | 5034 | 10 | 7 |
| WELL_1_0 | 5034.5 | 10 | 7 |
| WELL_1_0 | 5035 | 10 | 7 |
| WELL_1_0 | 5035.5 | 10 | 7 |
| WELL_1_0 | 5036 | 10 | 7 |
| WELL_1_0 | 5036.5 | 10 | 7 |
| WELL_1_0 | 5037 | 10 | 7 |
| WELL_1_0 | 5037.5 | 10 | 7 |
| WELL_1_0 | 5038 | 10 | 7 |
| WELL_1_0 | 5038.5 | 10 | 7 |
| WELL_1_0 | 5039 | 10 | 7 |
| WELL_1_0 | 5039.5 | 10 | 7 |
| WELL_1_0 | 5040 | 7 | 7 |

TABLE 2

Lithofacies Code Change in Well_4_0

| Well Name | DEPTH | Original Core Description | Corrected Core Description |
|---|---|---|---|
| WELL_4_0 | 5168 | −9999 | −9999 |
| WELL_4_0 | 5168.5 | 10 | 7 |
| WELL_4_0 | 5169 | 10 | 7 |
| WELL_4_0 | 5169.5 | 10 | 7 |

TABLE 2-continued

Lithofacies Code Change in Well_4_0

| Well Name | DEPTH | Original Core Description | Corrected Core Description |
|---|---|---|---|
| WELL_4_0 | 5170 | 10 | 7 |
| WELL_4_0 | 5170.5 | 10 | 7 |
| WELL_4_0 | 5171 | 10 | 7 |
| WELL_4_0 | 5171.5 | 10 | 7 |
| WELL_4_0 | 5172 | 10 | 7 |
| WELL_4_0 | 5172.5 | 10 | 7 |
| WELL_4_0 | 5173 | 10 | 7 |
| WELL_4_0 | 5173.5 | 10 | 7 |
| WELL_4_0 | 5174 | 10 | 7 |
| WELL_4_0 | 5174.5 | 10 | 7 |
| WELL_4_0 | 5175 | 10 | 7 |
| WELL_4_0 | 5175.5 | 10 | 7 |
| WELL_4_0 | 5176 | 10 | 7 |
| WELL_4_0 | 5176.5 | 10 | 7 |
| WELL_4_0 | 5177 | 10 | 7 |
| WELL_4_0 | 5177.5 | 10 | 7 |
| WELL_4_0 | 5178 | 10 | 7 |
| WELL_4_0 | 5178.5 | 7 | 7 |

TABLE 3

Lithofacies Code Change in Well_7_0

| Well Name | DEPTH | Original Core Description | Corrected Core Description |
|---|---|---|---|
| WELL_7_0 | 5205.5 | 6 | 7 |
| WELL_7_0 | 5206 | 6 | 7 |
| WELL_7_0 | 5206.5 | 6 | 7 |
| WELL_7_0 | 5207 | 6 | 7 |
| WELL_7_0 | 5207.5 | 6 | 7 |
| WELL_7_0 | 5208 | 6 | 7 |
| WELL_7_0 | 5208.5 | 6 | 7 |
| WELL_7_0 | 5209 | 7 | 7 |

Figure 20:
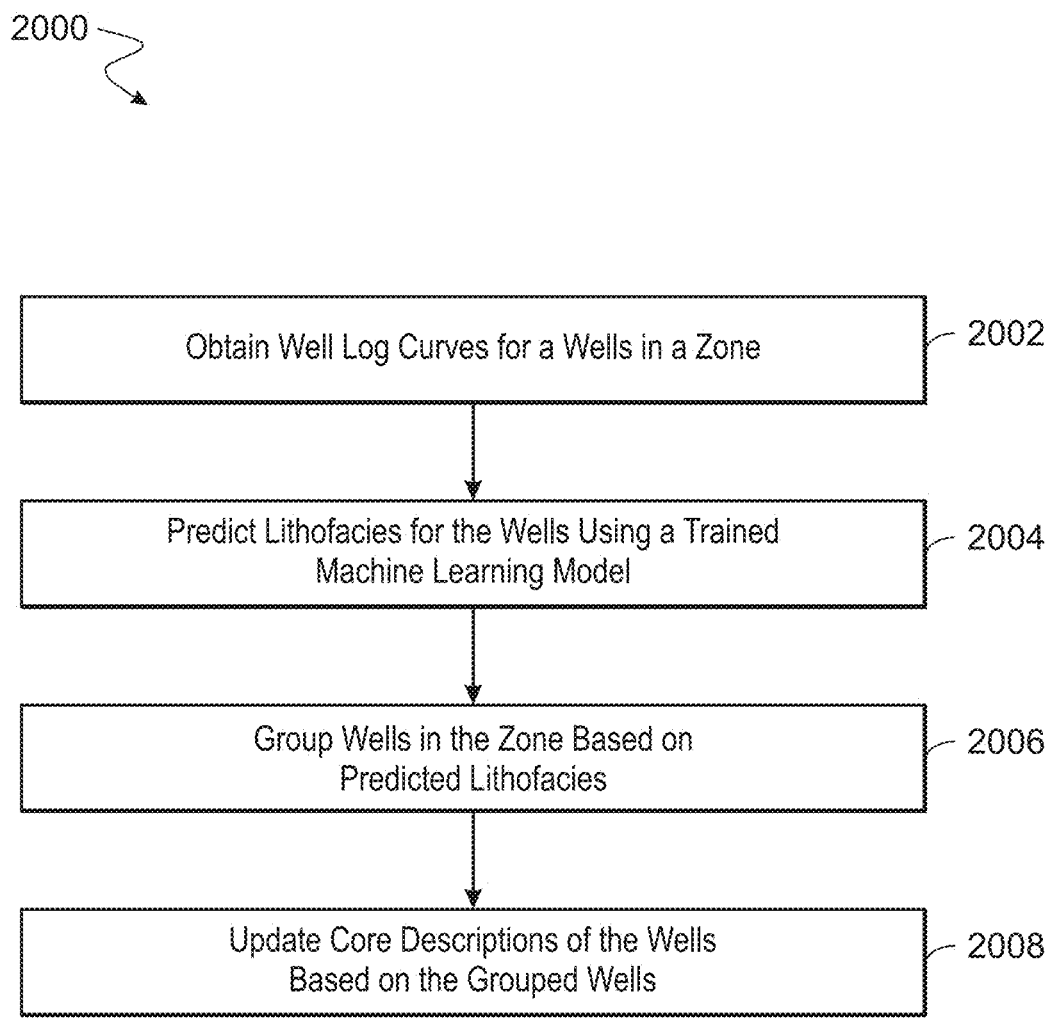
FIG. 20 is process flow diagram of a process for lithofacies guided core description using unsupervised machine learning.

FIG. 20 is a process flow diagram of a process 2000 for lithofacies guided core description using unsupervised machine learning.

At block 2002, well log curves are obtained for wells in a zone.

At block 2004, lithofacies are predicted for the wells using a machine learning model. The machine learning model is trained with input data that includes well log curves and well cores. In some embodiments, the machine learning models are trained using unsupervised machine learning.

At block 2006, the wells are grouped based on the predicted lithofacies.

At block 2008, the core descriptions of the wells are updated based on the grouped wells. In some embodiments, the present techniques invention enable sedimentologists and other experts to better group the wells and guide core description to improve the accuracy and efficiency of the process. New wells are grouped by applying the trained machine learning model for the new wells respective zone, and then describe the cores using guidance from the predicted lithofacies.

Figure 21:
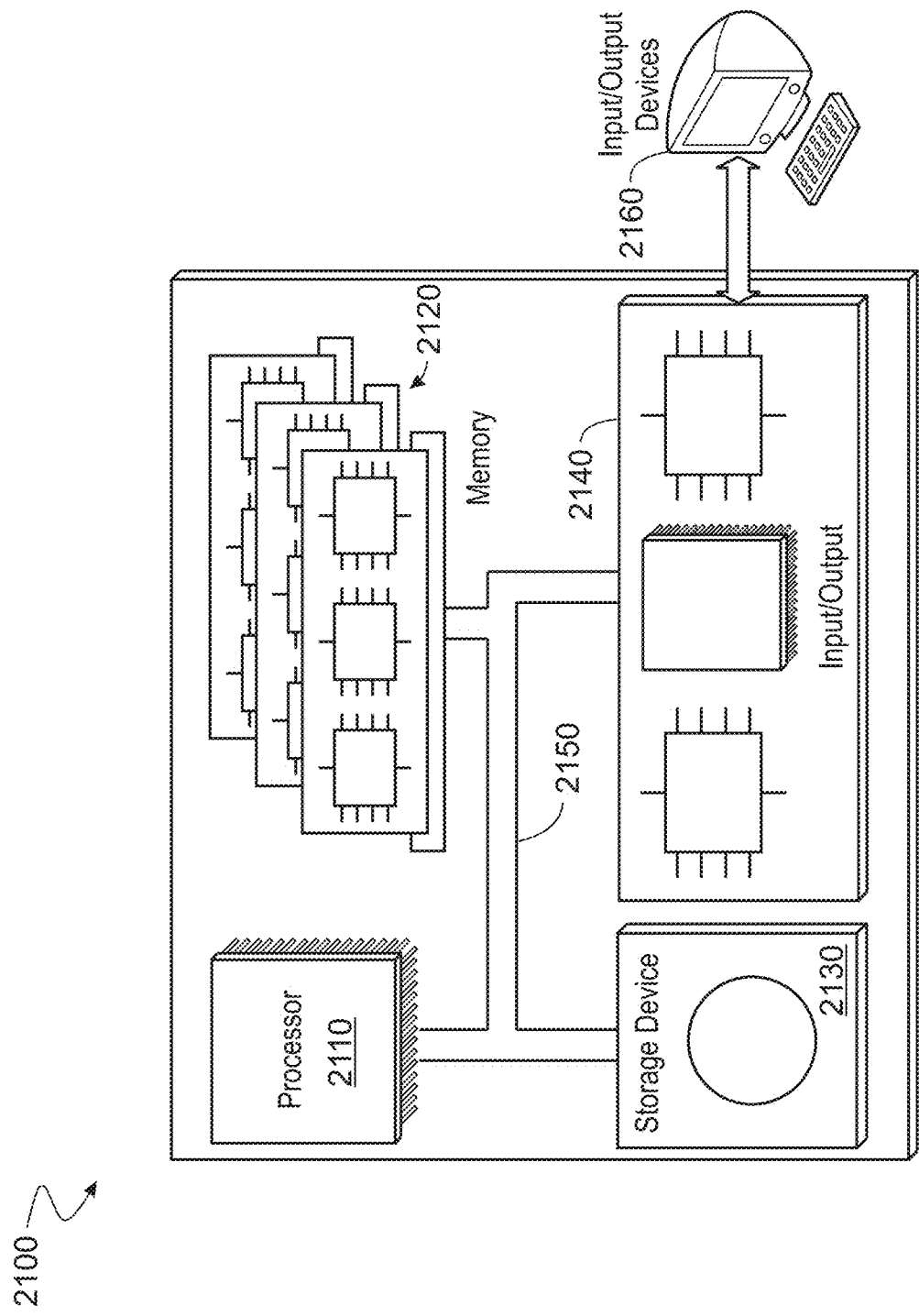
FIG. 21 is a schematic illustration of an example controller or control system for lithofacies guided core description using unsupervised machine learning according to the present disclosure.

FIG. 21 is a schematic illustration of an example controller 2100 (or control system) for lithofacies guided core description using unsupervised machine learning according to the present disclosure. For example, the controller 2100 may be operable according to the workflow 100 of FIG. 1A or the process 2000 of FIG. 20. The controller 2100 is intended to include various forms of digital computers, such as printed circuit boards (PCB), processors, digital circuitry, or otherwise parts of a system for automated dew point pressure prediction. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 2100 includes a processor 2110, a memory 2120, a storage device 2130, and an input/output interface 2140 communicatively coupled with input/output devices 2160 (for example, displays, keyboards, measurement devices, sensors, valves, pumps). Each of the components 2110, 2120, 2130, and 2140 are interconnected using a system bus 2150. The processor 2110 is capable of processing instructions for execution within the controller 2100. The processor may be designed using any of a number of architectures. For example, the processor 2110 may be a CISC (Complex Instruction Set Computers) processor, a RISC (Reduced Instruction Set Computer) processor, or a MISC (Minimal Instruction Set Computer) processor.

In one implementation, the processor 2110 is a single-threaded processor. In another implementation, the processor 2110 is a multi-threaded processor. The processor 2110 is capable of processing instructions stored in the memory 2120 or on the storage device 2130 to display graphical information for a user interface via the input/output interface 2140 at an input/output device 2160.

The memory 2120 stores information within the controller 2100. In one implementation, the memory 2120 is a computer-readable medium. In one implementation, the memory 2120 is a volatile memory unit. In another implementation, the memory 2120 is a nonvolatile memory unit.

The storage device 2130 is capable of providing mass storage for the controller 2100. In one implementation, the storage device 2130 is a computer-readable medium. In various different implementations, the storage device 2130 may be a floppy disk device, a hard disk device, an optical disk device, or a tape device.

The input/output interface 2140 provides input/output operations for the controller 2100. In one implementation, the input/output devices 2160 includes a keyboard and/or pointing device. In another implementation, the input/output devices 2160 includes a display unit for displaying graphical user interfaces.

There can be any number of controllers 2100 associated with, or external to, a computer system containing controller 2100, with each controller 2100 communicating over a network. Further, the terms "client," "user," and other appropriate terminology can be used interchangeably, as appropriate, without departing from the scope of the present disclosure. Moreover, the present disclosure contemplates that many users can use one controller 2100 and one user can use multiple controllers 2100.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing to apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship. Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. A computer-implemented method, comprising:
obtaining, with one or more hardware processors, well log curves for training wells in a each respective zone of a formation comprising multiple zones;
preparing, with the one or more hardware processors, the well log curves using zone data to limit the prepared well log curves to each respective zone;
training, with the one or more hardware processors, a machine learning model with input data comprising the prepared well log curves for each respective zone of the multiple zones, wherein the trained machine learning models output predicted lithofacies for wells in each respective zone of the multiple zones;
predicting, with the one or more hardware processors, lithofacies for wells in the each respective zone using the trained machine learning models;

grouping, with the one or more hardware processors, the wells in the each respective zone based on the predicted lithofacies; and updating, with the one or more hardware processors, core descriptions of the wells in each respective zone of the multiple zones based on the grouped wells.

2. The computer implemented method of claim 1, wherein the machine learning model is trained with input data comprising well log curves using unsupervised machine learning.

3. The computer implemented method of claim 1, wherein the well log curves are Gamma Ray, Bulk Density and Neutron Porosity well log curves.

4. The computer implemented method of claim 1, wherein preparing the well log curves comprises normalizing the well log curves.

5. The computer implemented method of claim 1, wherein updating core descriptions of the wells based on the grouped wells comprises determining depositional environment associations across the predicted lithofacies for the wells.

6. The computer implemented method of claim 1, wherein well grouping is based on predetermined threshold percentages.

7. An apparatus comprising a non-transitory, computer readable, storage medium that stores instructions that, when executed by at least one processor, cause the at least one processor to perform operations comprising:

obtaining well log curves for training wells in a respective zone of a formation comprising multiple zones;

preparing the well log curves using zone data to limit the prepared well log curves to each respective zone;

training a machine learning model with input data comprising the prepared well log curves for each respective zone of the multiple zones, wherein the trained machine learning models output predicted lithofacies for wells in each respective zone of the multiple zones;

predicting lithofacies for wells in the each respective zone using the trained machine learning models;

grouping the wells in the each respective zone based on the predicted lithofacies; and updating core descriptions of the wells in each respective zone of the multiple zones based on the grouped wells.

8. The apparatus of claim 7, wherein the machine learning model is trained with input data comprising well log curves using unsupervised machine learning.

9. The apparatus of claim 7, wherein the well log curves are Gamma Ray, Bulk Density and Neutron Porosity well log curves.

10. The apparatus of claim 7, wherein preparing the well log curves comprises normalizing the well log curves.

11. The apparatus of claim 7, wherein updating core descriptions of the wells based on the grouped wells comprises determining depositional environment associations across the predicted lithofacies for the wells.

12. The apparatus of claim 7, wherein well grouping is based on predetermined threshold percentages.

13. A system, comprising:

one or more memory modules;

one or more hardware processors communicably coupled to the one or more memory modules, the one or more hardware processors configured to execute instructions stored on the one or more memory models to perform operations comprising:

obtaining well log curves for training wells in a respective zone of a formation comprising multiple zones;

preparing the well log curves using zone data to limit the prepared well log curves to each respective zone;

training a machine learning model with input data comprising the prepared well log curves for each respective zone of the multiple zones, wherein the trained machine learning models output predicted lithofacies for wells in each respective zone of the multiple zones;

predicting lithofacies for wells in the each respective zone using the trained machine learning models;

grouping the wells in each respective zone based on the predicted lithofacies; and updating core descriptions of the wells in each respective zone of the multiple zones based on the grouped wells.

14. The system of claim 13, wherein the machine learning model is trained with input data comprising well log curves using unsupervised machine learning.

15. The system of claim 13, wherein the well log curves are Gamma Ray, Bulk Density and Neutron Porosity well log curves.

16. The system of claim 13, wherein preparing the well log curves comprises normalizing the well log curves.

17. The system of claim 13, wherein updating core descriptions of the wells based on the grouped wells comprises determining depositional environment associations across the predicted lithofacies for the wells.

* * * * *